United States Patent
Kawashima et al.

(10) Patent No.: US 6,508,937 B1
(45) Date of Patent: *Jan. 21, 2003

(54) FRESH WATER GENERATOR AND FRESH WATER GENERATING METHOD

(75) Inventors: Toshiyuki Kawashima, Osaka (JP); Ichirou Kawada, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,314

(22) Filed: Oct. 20, 1999

(30) Foreign Application Priority Data

Oct. 20, 1998 (JP) ............................ 10-298865
Jun. 15, 1999 (JP) ............................ 11-168959

(51) Int. Cl.$^7$ .................. B01D 61/00; B01D 63/00
(52) U.S. Cl. .............. 210/652; 210/636; 210/134; 210/257.2
(58) Field of Search .................. 210/89, 90, 636, 210/652, 134, 136, 142, 195.2, 257.2, 195.1, 321.69, 669, 637

(56) References Cited

U.S. PATENT DOCUMENTS

| | | |
|---|---|---|
| 3,856,676 A | 12/1974 | Grimme, Jr. et al. |
| 4,193,872 A * | 3/1980 | Parkinson |
| 4,391,712 A | 7/1983 | Tyler et al. |
| 5,122,265 A | 6/1992 | Mora et al. |
| 5,147,533 A * | 9/1992 | Lipshultz et al. |
| 5,156,739 A * | 10/1992 | Dawson et al. |
| 5,503,735 A * | 4/1996 | Vinas et al. |
| 5,614,099 A * | 3/1997 | Hirose |
| 5,647,973 A * | 7/1997 | Desaulniers |
| 5,888,401 A * | 3/1999 | Nguyen |
| 5,925,240 A * | 7/1999 | Wilkins et al. |
| 6,024,873 A * | 2/2000 | Hirose et al. |
| 6,334,955 B1 * | 1/2002 | Kawashima et al. |

FOREIGN PATENT DOCUMENTS

| | | | |
|---|---|---|---|
| DE | 26 27 366 A1 | | 12/1977 |
| DE | 40 15 336 A1 | | 11/1991 |
| GB | 1445799 | * | 8/1976 |
| JP | 57-147405 | | 9/1982 |
| JP | 08-206652 | | 8/1996 |
| JP | 10-249332 | | 9/1998 |

OTHER PUBLICATIONS

U.S. patent application Ser. No. 09/421,998, Fukushima et al., filed Oct. 20, 1998.

* cited by examiner

*Primary Examiner*—Ana Fortuna
(74) *Attorney, Agent, or Firm*—Akin, Gump, Strauss, Hauer & Feld, L.L.P.

(57) ABSTRACT

An active carbon cartridge is provided in the preceding stage to a fresh water generating cartridge. A water feed valve is connected to a raw water inlet of the active carbon cartridge. A bypass pipe is connected to bypass the water feed valve and the active carbon cartridge, and a bypass valve is inserted in the bypass pipe. A flushing valve is provided on the fresh water generating cartridge. A timer controls opening and closing of the bypass valve and the flushing valve. The bypass valve as well as the flushing valve are periodically opened during interruption of fresh water generation work with the fresh water generating cartridge or during fresh water generation work, or opened simultaneously with interruption of fresh water generation work or when restarting fresh water generation work.

31 Claims, 8 Drawing Sheets

FRESH WATER GENERATOR AND FRESH WATER GENERATING METHOD

BACKGROUND OF THE INVENTION

1. Field of the Invention

The present invention relates to a fresh water generator and a fresh water generating method for desalinating a target liquid containing residual chlorine by feeding the same to a fresh water generating cartridge having a reverse osmosis membrane.

2. Description of the Prior Art

When desalinating a target liquid (hereinafter referred to as raw water) such as service water or industrial water containing residual chlorine, a fresh water generator having a fresh water generating cartridge including a reverse osmosis membrane (RO membrane) separates the raw water into permeated water and concentrated water. In order to obtain permeated water in a necessary and sufficient flow rate in a fresh water generator having a limited scale, a permeated water storage tank is provided on the fresh water generator for storing unused permeated water therein or a pressure pump is provided on the fresh water generator for increasing the permeate flow rate per unit membrane area.

FIG. 8 is a block diagram showing an exemplary conventional fresh water generator having a pressure pump 100.

The fresh water generator shown in FIG. 8 employs the pressure pump 100 and a fresh water generating cartridge 4 for desalination. The fresh water generating cartridge 4 includes a reverse osmosis membrane. The reverse osmosis membrane is reduced in durability when exposed to chlorine for a long time, and hence an active carbon cartridge 2 is employed for pretreatment in order to remove residual chlorine contained in raw water.

The raw water is fed to the active carbon cartridge 2 through a raw water feed pipe 1. The pressure pump 100 feeds the water permeating the active carbon cartridge 2 as pretreated water to the fresh water generating cartridge 4 through a pretreated water feed pipe 3. The fresh water generating cartridge 4 having the reverse osmosis membrane separates the pretreated water into permeated water and concentrated water. The separated permeated water is taken out from the fresh water generating cartridge 4 as treated water through a permeated water outlet pipe 5. On the other hand, the concentrated water is discharged from the fresh water generating cartridge 4 through a concentrated water discharge pipe 7. The concentrated water discharge pipe 7 is provided with a pressure regulating valve 6, for suppressing the concentrate flow rate. Thus, permeation through the membrane is prompted in the fresh water generating cartridge 4.

However, the aforementioned fresh water generator requires a driver (not shown) such as a motor or an engine for driving the pressure pump 100 and a controller (not shown) for controlling the driver. Thus, the fresh water generating cost as well as the price of the fresh water generator increase. Further, noise generated in the pressure pump 100 and the driver results in a problem.

When fresh water generation work with the fresh water generator is stopped over a long period, bacteria propagate in the fresh water generating cartridge and are mixed into permeated water when fresh water generation work is restarted, to deteriorate the quality of the permeated water.

SUMMARY OF THE INVENTION

An object of the present invention is to provide a fresh water generator which can be reliably operated at a low cost while preventing a permeated liquid from deterioration of quality resulting from propagation of bacteria with no problem of noise.

Another object of the present invention is to provide a fresh water generating method which can be reliably carried out at a low cost while preventing a permeated liquid from deterioration of quality resulting from propagation of bacteria with no problem of noise.

The inventor has made various experiments and deep study for desalinating a target liquid without employing a pressure pump while suppressing propagation of bacteria, to find out that it is possible to desalinate a target liquid having a pressure of not more than 2 kgf/cm$^2$ by feeding the same to a fresh water generating cartridge having a reverse osmosis membrane without employing a pressure pump when employing a reverse osmosis membrane having a performance of a rejection of at least 95% for an NaCl aqueous solution of 0.05% in concentration and a permeate flow rate of at least 0.1 m$^3$/m$^2$·day·kgf/cm$^2$.

The inventor has also found out that propagation of bacteria in the fresh water generating cartridge can be suppressed by feeding the target liquid to the fresh water generating cartridge through a pretreater for removing residual chlorine while properly feeding the target liquid to the fresh water generating cartridge while bypassing the pretreater. The inventor has proposed the present invention on the basis of such recognition.

A fresh water generator according to an aspect of the present invention comprises a fresh water generating cartridge, including a reverse osmosis membrane, for desalinating a target liquid, a pretreater provided in the preceding stage to the fresh water generating cartridge for removing residual chlorine contained in the target liquid, a feed system feeding the target liquid having a prescribed pressure to the pretreater without through a step-up device stepping up the pressure of the target liquid, a bypass path provided to bypass the pretreater and an opening/closing device opening and closing the bypass path.

In this fresh water generator, the target liquid having a prescribed pressure is fed to the pretreater so that residual chlorine contained therein is removed. The target liquid obtained from the pretreater is fed to the fresh water generating cartridge having the reverse osmosis membrane, and desalinated. If the target liquid from which the residual chlorine having a bactericidal function is removed remains in the fresh water generating cartridge, bacteria readily propagate therein. Therefore, the opening/closing device opens the bypass path, so that the target liquid containing residual chlorine can be fed to the fresh water generating cartridge. Thus, propagation of bacteria can be suppressed in the fresh water generating cartridge. Consequently, the permeated liquid is prevented from deterioration of quality resulting from propagation of bacteria.

In the fresh water generator, the target liquid having a prescribed pressure is fed to the fresh water generating cartridge through the pretreater in a non-powered manner without through a pressure pump serving as a step-up device, whereby neither a driver for driving the pressure pump nor a controller for controlling the driver is necessary. Thus, the fresh water generating cost is reduced while increase of the price of the fresh water generator is suppressed. Further, no problem of noise is caused by any pressure pump or driver. In addition, the fresh water generator requiring no pressure pump, no driver and no controller is miniaturized and no electric charge is required.

If the time interval for feeding the target liquid containing residual chlorine to the fresh water generating cartridge through the bypass path is longer than 12 hours, the bactericidal effect of residual chlorine contained in the target liquid fed to the fresh water generating cartridge through the bypass path is lost and propagation of bacteria is disadvantageously prompted. If the time interval for feeding the target liquid containing residual chlorine to the fresh water generating cartridge through the bypass path is shorter than 10 minutes, on the other hand, the flow rate of a wastefully discharged target liquid is uneconomically increased. Therefore, the time interval for feeding the target liquid containing residual chlorine to the fresh water generating cartridge through the bypass path is preferably at least 10 minutes and not more than 12 hours.

If the time for feeding the target liquid containing residual chlorine to the fresh water generating cartridge through the bypass path is shorter than 5 seconds, propagation of bacteria in the fresh water generating cartridge cannot be sufficiently suppressed. If the time for feeding the target liquid containing residual chlorine to the fresh water generating cartridge through the bypass path is longer than 5 minutes, on the other hand, the reverse osmosis membrane may be damaged. Therefore, the time for feeding the target liquid containing residual chlorine to the fresh water generating cartridge through the bypass path is preferably at least 5 seconds and not more than 5 minutes, and more preferably at least 15 seconds and not more than 2 minutes.

The prescribed pressure may be at least 0.3 kgf/cm$^2$ and not more than 3 kgf/cm$^2$. In this case, desalination can be performed without employing a pressure pump.

The opening/closing device may periodically open the bypass path. In this case, the target liquid containing residual chlorine having a bactericidal function is periodically fed to the fresh water generating cartridge, thereby periodically suppressing propagation of bacteria in the fresh water generating cartridge.

The opening/closing device may temporarily open the bypass path and thereafter close the bypass path when fresh water generation work with the fresh water generating cartridge is started. In this case, the target liquid containing residual chlorine having a bactericidal function is fed to the fresh water generating cartridge when starting fresh water generation work, so that bacteria having propagated in the fresh water generating cartridge during stoppage of fresh water generation work can be disinfected and sterilized. Thus, propagation of bacteria in the fresh water generating cartridge is suppressed during fresh water generation work, and the permeated liquid is prevented from deterioration of quality resulting from propagation of bacteria.

The opening/closing device may open the bypass path during fresh water generation work with the fresh water generating cartridge. In this case, the target liquid containing residual chlorine having a bactericidal function is fed to the fresh water generating cartridge during fresh water generation work, so that bacteria propagating in the fresh water generating cartridge during fresh water generation work can be disinfected and sterilized. Thus, propagation of bacteria in the fresh water generating cartridge is suppressed during fresh water generation work, and the permeated liquid is prevented from deterioration of quality resulting from propagation of bacteria. In this case, the bypass path may be periodically or non-periodically opened during fresh water generation work.

The opening/closing device may open the bypass path simultaneously with stoppage of fresh water generation work with the fresh water generating cartridge. In this case, the target liquid containing residual chlorine having a bactericidal function is fed to the fresh water generating cartridge simultaneously with stoppage of fresh water generation work, so that bacteria propagating in the fresh water generating cartridge during fresh water generation work can be disinfected and sterilized. Thus, propagation of bacteria in the fresh water generating cartridge is suppressed during stoppage of fresh water generation work, and the permeated liquid is prevented from deterioration of quality resulting from propagation of bacteria.

The opening/closing device may open the bypass path during stoppage of fresh water generation work with the fresh water generating cartridge. In this case, the target liquid containing residual chlorine having a bactericidal function is fed to the fresh water generating cartridge during stoppage of fresh water generation work, for suppressing propagation of bacteria in the fresh water generating cartridge during stoppage of fresh water generation work. Thus, the permeated liquid is prevented from deterioration of quality resulting from mixture with propagating bacteria when fresh water generation work is restarted.

The ratio b/a of the flow rate b of the permeated liquid obtained from the fresh water generating cartridge to the flow rate a of the target liquid fed to the fresh water generating cartridge may be so set that b/a>0.5.

In desalination with the fresh water generating cartridge having the reverse osmosis membrane, the target liquid fed to the fresh water generating cartridge is separated into a permeated liquid from which impurities are removed and a concentrated liquid in which impurities are concentrated. In order to increase the linear velocity on the surface of the reverse osmosis membrane for maintaining the membrane performance, the permeate flow rate b may be minimized so that the concentrate flow rate (a–b) approaches the target liquid flow rate a. When the ratio b/a of the permeate flow rate b to the target liquid flow rate a is minimized to 0.1 or 0.2, for example, the linear velocity on the surface of the reverse osmosis membrane is maintained in a state close to that on the inlet for the target liquid. However, the concentrated liquid is generally discarded and hence the flow rate b of the essentially required permeated liquid is uneconomically reduced if the ratio b/a of the permeate flow rate b to the target liquid flow rate a is at a low value.

In the fresh water generator according to the present invention, propagation of bacteria can be suppressed in the fresh water generating cartridge by providing the bypass path on the pretreater, whereby the quality of the permeated liquid can be maintained even if the ratio b/a of the permeate flow rate b to the target liquid flow rate a exceeds 0.5. Consequently, an economical permeate flow rate can be obtained.

The fresh water generating cartridge may be formed by a plurality of fresh water generating cartridges connected in parallel and/or in series with each other. In this case, a large volume of permeated liquid can be obtained while preventing deterioration of the quality of the permeated liquid resulting from propagation of bacteria.

The opening/closing device may include an opening/closing valve. In this case, the target liquid containing residual chlorine can be fed to the fresh water generating cartridge through the bypass path by opening the opening/closing valve while the target liquid containing residual chlorine can be fed to the pretreater by closing the opening/closing valve.

The opening/closing value may include a first automatic valve, and the fresh water generator may further comprise a first controller controlling an opening and closing operation of the first automatic valve. In this case, the first controller automatically controls the opening and closing operation of the first automatic valve.

The first controller may control the first automatic valve to open the first automatic valve by a prescribed time at a prescribed time interval. Thus, the target liquid containing residual chlorine is periodically and automatically fed to the fresh water generating cartridge through the bypass path. Consequently, propagation of bacteria can be automatically suppressed in the fresh water generating cartridge.

The fresh water generator may further comprise a flushing device for flushing the reverse osmosis membrane of the fresh water generating cartridge. The term "flushing" indicates an operation of washing the surface of a separation membrane with a water stream.

In this case, impurities remaining on the surface of the reverse osmosis membrane of the fresh water generating cartridge can be discharged from the fresh water generating cartridge by flushing the reverse osmosis membrane of the fresh water generating cartridge with the flushing device. Consequently, it is possible to prevent deterioration of the quality of the permeated liquid in a short period and reduction of the permeate flow rate over time caused by an insufficient linear velocity on the surface of the reverse osmosis membrane.

The flushing device may periodically perform the flushing operation. Thus, impurities remaining on the surface of the reverse osmosis membrane of the fresh water generating cartridge can be periodically discharged from the fresh water generating cartridge.

The flushing device may perform the flushing operation when fresh water generation work with the fresh water generating cartridge is started. Thus, impurities such as fungi generated and deposited in the fresh water generating cartridge during stoppage of fresh water generation work can be discharged from the fresh water generating cartridge.

The flushing device may perform the flushing operation during fresh water generation work with the fresh water generating cartridge. Thus, impurities remaining on the surface of the reverse osmosis membrane of the fresh water generating cartridge during fresh water generation work can be discharged from the fresh water generating cartridge. In this case, flushing may be periodically or non-periodically performed during fresh water generation work.

The flushing device may perform the flushing operation simultaneously with stoppage of fresh water generation work with the fresh water generating cartridge. Thus, impurities remaining on the surface of the reverse osmosis membrane of the fresh water generating cartridge during fresh water generation work can be discharged from the fresh water generating cartridge.

The flushing device may perform the flushing operation during stoppage of fresh water generation work with the fresh water generating cartridge. Thus, impurities such as fungi generated and deposited in the fresh water generating cartridge during stoppage of fresh water generation work can be discharged from the fresh water generating cartridge.

The flushing device may be a flushing valve stored in the fresh water generating cartridge. Alternatively, the flushing device may be a flushing valve provided in a concentrated liquid path of the fresh water generating cartridge. In this case, the concentrate flow rate is increased by opening the flushing valve to increase the linear velocity on the surface of the reverse osmosis membrane of the fresh water generating cartridge. Thus, impurities remaining on the surface of the reverse osmosis membrane are discharged from the fresh water generating cartridge.

If a plurality of fresh water generating cartridges are provided in parallel or in series with each other, the flushing valve may be stored in each fresh water generating cartridge or may be provided on the concentrated liquid path of each fresh water generating cartridge. Alternatively, the flushing valve may be provided on the rearmost one of connected portions between the concentrated liquid paths of the plurality of fresh water generating cartridges. Further, a prescribed number of fresh water generating cartridges arranged in parallel or in series with each other with a flushing valve provided on the rearmost one of connected portions between the concentrated liquid paths thereof may be integrated into a unit so that a plurality of such units are arranged in parallel or in series with each other.

The flushing valve may include a second automatic valve, and the fresh water generator may further comprise a second controller controlling an opening and closing operation of the second automatic valve. In this case, the second controller automatically controls the opening and closing operation of the second automatic valve.

The second controller may control the second automatic valve to open the second automatic valve by a prescribed time at a prescribed time interval. Thus, the second automatic valve is periodically and automatically opened for periodically flushing the fresh water generating cartridge. Consequently, impurities remaining on the surface of the reverse osmosis membrane are periodically discharged from the fresh water generating cartridge.

The opening/closing device may include a first automatic valve, the flushing device may include a second automatic valve, and the fresh water generator may further comprise a controller independently or simultaneously controlling opening and closing operations of the first automatic valve and the second automatic valve respectively. In this case, the controller automatically controls the opening and closing operations of the first automatic valve and the second automatic valve independently of or simultaneously with each other.

Preferably, the opening/closing device opens the bypass path at a first time interval c, the flushing device performs the flushing operation at a second time interval d, and the ratio c/d of the first time interval c to the second time interval d is so set that $c/d \geq 1$.

If the ratio c/d of the first time interval c to the second time interval d is less than 1, the frequency of feeding the target liquid containing residual chlorine to the fresh water generating cartridge by opening the first automatic valve is increased to deteriorate the quality of the permeated liquid. Further, the first automatic valve attains a sufficient effect of suppressing propagation of bacteria through single opening with respect to one or more flushing operations of the second automatic valve. Therefore, it is possible to prevent deterioration of the quality of the permeated liquid by setting the ratio c/d of the first time interval c to the second time interval d to at least 1.

The fresh water generator may be provided with a permeated liquid outlet path taking out a permeated liquid obtained from the fresh water generating cartridge and a permeated liquid discharge path discharging the permeated liquid. In this case, the permeated liquid taken out from the permeated liquid outlet path is employed for various applications as desalinated water. On the other hand, the permeated liquid discharged from the permeated liquid discharge path is not used but discharged as waste water.

In the fresh water generator thus provided with the permeated liquid discharge path, impurities deposited in the fresh water generating cartridge can be discharged from the fresh water generating cartridge through the permeated liquid discharge path along with the permeated liquid. The permeated liquid containing a large amount of impurities is discharged through the permeated liquid discharge path and hence only a permeated liquid having high quality is taken out from the permeated liquid outlet path. Therefore, the permeated liquid taken out from the permeated liquid outlet path is prevented from contamination with impurities and deterioration of quality.

In the aforementioned fresh water generator, further, raw water containing residual chlorine fed to the fresh water generating cartridge through the bypass path can be treated with the fresh water generating cartridge and thereafter discharged through the permeated liquid discharge path. Thus, the fresh water generating cartridge and the outlet for the permeated liquid are sterilized and propagation of bacteria can be suppressed.

The permeated liquid may be periodically discharged through the permeated liquid discharge path. Thus, impurities deposited in the fresh water generating cartridge can be periodically discharged from the fresh water generating cartridge through the permeated liquid discharge path along with the permeated liquid.

The permeated liquid may be discharged through the permeated liquid discharge path when fresh water generation work with the fresh water generating cartridge is started. Alternatively, the permeated liquid may be discharged through the permeated liquid discharge path during stoppage of fresh water generation work with the fresh water generating cartridge. In this case, impurities deposited in the fresh water generating cartridge during stoppage of fresh water generation work can be discharged from the fresh water generating cartridge through the permeated liquid discharge path.

The reverse osmosis membrane may have a performance of a rejection of at least 95% for an NaCl aqueous solution of 0.05% in concentration and a permeate flow rate of at least 0.1 $m^3/m^2 \cdot day \cdot kgf/cm^2$. In this case, the target liquid having a prescribed pressure can be fed to the fresh water generating cartridge without employing a pressurizer for readily performing desalination.

A fresh water generating method according to another aspect of the present invention comprises steps of feeding a target liquid having a prescribed pressure to a fresh water generating cartridge including a reverse osmosis membrane through a pretreater removing residual chlorine without through a step-up device stepping up the pressure, and feeding the target liquid to the fresh water generating cartridge while bypassing the pretreater at prescribed timing.

In this fresh water generating method, the target liquid having a prescribed pressure is fed to the pretreater so that residual chlorine contained in the target liquid is removed. The treated liquid obtained from the pretreater is fed to the fresh water generating cartridge having the reverse osmosis membrane and desalinated. When the treated liquid from which residual chlorine having a bactericidal function is removed remains in the fresh water generating cartridge, bacteria readily propagate therein. When feeding the target liquid to the fresh water generating cartridge while bypassing the pretreater at prescribed timing, therefore, the target liquid containing residual chlorine can be fed to the fresh water generating cartridge. Thus, propagation of bacteria can be suppressed in the fresh water generating cartridge. Consequently, the permeated liquid is prevented from deterioration of quality resulting from propagation of bacteria.

In this fresh water generating method, further, the target liquid having a prescribed pressure is fed to the fresh water generating cartridge in a non-powered manner without employing a pressure pump as a step-up device through the pretreater, whereby neither a driver for driving the pressure pump nor a controller for controlling the driver is required. Therefore, the fresh water generating cost is reduced and increase of the price of a fresh water generator is suppressed. Further, no problem of noise is caused by any pressure pump or driver.

The fresh water generating method may further comprise a step of flushing the reverse osmosis membrane of the fresh water generating cartridge at prescribed timing. Thus, impurities remaining on the surface of the reverse osmosis membrane of the fresh water generating cartridge can be discharged from the fresh water generating cartridge. Consequently, it is possible to prevent deterioration of the quality of the permeated liquid in a short period and reduction of the permeate flow rate over time caused by an insufficient linear velocity on the surface of the reverse osmosis membrane.

The fresh water generating method may further comprise a step of discharging a permeated liquid obtained from the fresh water generating cartridge through a permeated liquid discharge path at prescribed timing. In this case, impurities deposited in the fresh water generating cartridge and on the outlet for the permeated liquid can be discharged from the fresh water generating cartridge along with the permeated liquid. The permeated liquid containing a large amount of impurities is discharged through the permeated liquid discharge path, and hence no discharged impurities are mixed into the permeated liquid taken out from the permeated liquid outlet path. Therefore, the permeated liquid is prevented from deterioration of quality and a permeated liquid having high quality can be obtained. Further, water containing residual chlorine fed to the fresh water generating cartridge through the bypass path can be treated with the fresh water generating cartridge and thereafter discharged through the permeated liquid discharge path, whereby propagation of bacteria can be suppressed in the fresh water generating cartridge and on the outlet for the permeated liquid.

The fresh water generating method may further comprise a step of applying the permeated liquid obtained from the fresh water generating cartridge to wash water, soft water for a boiler, soft water for preparing food, agricultural water for hydroponics, pure water for a laboratory, water for a humidifier or potable water.

The fresh water generating method may further comprise a step of feeding the permeated liquid obtained from the fresh water generating cartridge to an ion exchanger or a continuous electric regenerative ion exchanger. In this case, purity of the permeated liquid is further improved by the ion exchanger or the continuous electric regenerative ion exchanger, whereby extrapure water is obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
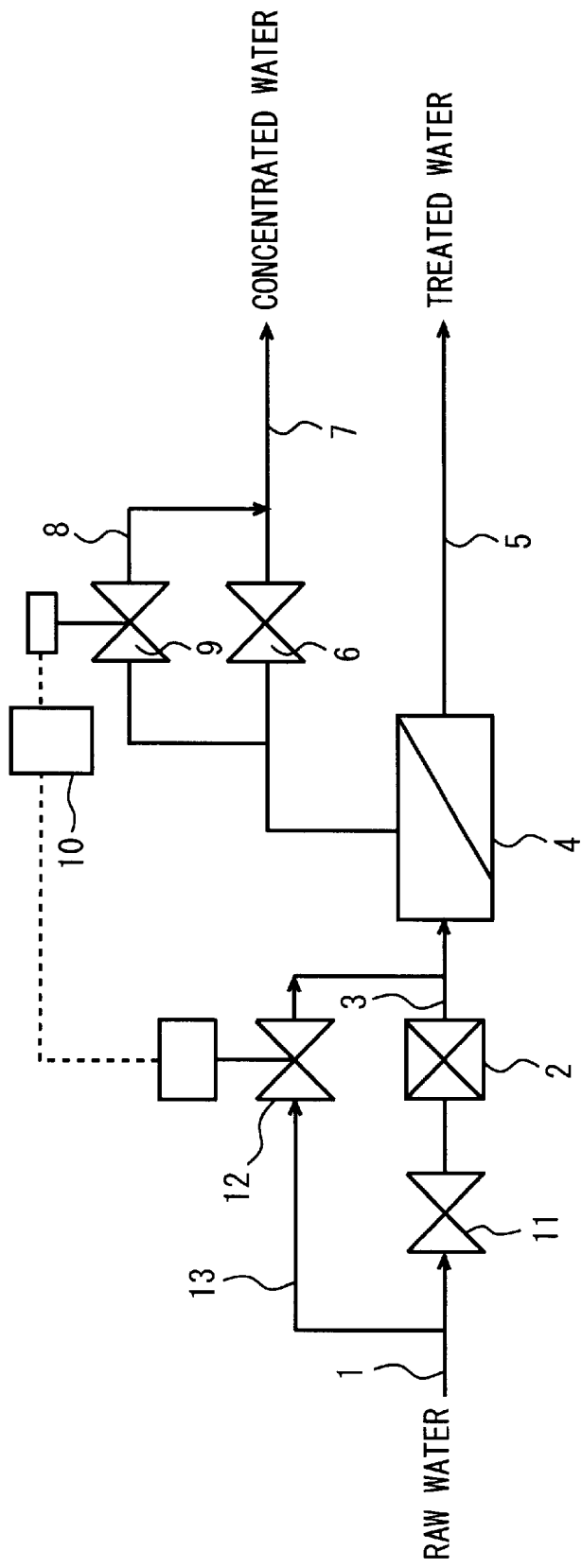
FIG. 1 is a block diagram showing a fresh water generator according to a first embodiment of the present invention.

FIG. 1 is a block diagram showing a fresh water generator according to a first embodiment of the present invention.

The fresh water generator shown in FIG. 1 employs an active carbon cartridge 2 for pretreatment and a fresh water generating cartridge 4 for desalination.

A raw water feed pipe 1 is connected to a raw water inlet of the active carbon cartridge 2 through a water feed valve 11. A permeated water outlet of the active carbon cartridge 2 is connected to a raw water inlet of the fresh water generating cartridge 4 through a pretreated water feed pipe 3. A bypass pipe 13 is connected to bypass the water feed valve 11 and the active carbon cartridge 2, and a bypass valve 12 is inserted in the bypass pipe 13. The bypass valve 12 is formed by an automatic valve. The water feed valve 11 may be an automatic valve.

A permeated water outlet pipe 5 is connected to a permeated water outlet of the fresh water generating cartridge 4, while a concentrated water outlet pipe 7 is connected to a concentrated water outlet thereof.

A pressure regulating valve 6 is inserted in the concentrated water outlet pipe 7, and a flushing valve 9 is connected in parallel with the pressure regulating valve 6 through a wash water pipe 8. The flushing valve 9 is formed by an automatic valve.

A timer 10 independently or simultaneously controls opening and closing operations of the flushing valve 9 and the bypass valve 12 respectively. The flushing valve 9 and the timer 10 are employed for washing the fresh water generating cartridge 4. The timer 10 may also control the water feed valve 11 independently of or simultaneously with the flushing valve 9 or the bypass valve 12.

In this embodiment, the raw water feed pipe 1 and the water feed valve 11 correspond to the feed system, and the active carbon cartridge 2 corresponds to the pretreater. The bypass pipe 13 corresponds to the bypass path, and the bypass valve 12 corresponds to the opening/closing device, the opening/closing valve or the first automatic valve. Further, the wash water pipe 8 and the flushing valve 9 correspond to the flushing device. In particular, the flushing valve 9 corresponds to the second automatic valve. The timer 10 corresponds to the first controller, the second controller or the controller, and the permeated water outlet pipe 5 corresponds to the permeated liquid outlet path.

A reverse osmosis membrane module, for example, is employed as the fresh water generating cartridge 4. The reverse osmosis membrane module is formed by charging a reverse osmosis membrane spiral wound type element. In this embodiment, a reverse osmosis membrane module having a performance of a rejection of at least 95% for an NaCl aqueous solution of 0.05% in concentration and a permeate flow rate of at least 0.1 m³/m²·day·kgf/cm² is employed.

Assuming that Cf represents the concentration of a target solute in feed water and Cp represents the concentration of the target solute in permeated water, the rejection R (%) is defined as follows:

$$R(\%) = (1 - Cp/Cf) \times 100 \qquad (1)$$

The permeate flow rate in such a reverse osmosis membrane module is extremely larger than that in a reverse osmosis membrane module employed for general membrane separation. In the reverse osmosis membrane module employed for the fresh water generating cartridge 4, the rejection for an NaCl aqueous solution of 0.05% in concentration is at least 95% under conditions of a water temperature of 25° C. and an operation pressure of 7.5 kgf/cm², for example, and the permeate flow rate is at least 0.8 m³/m²·day. In the reverse osmosis membrane module employed for general membrane separation, on the other hand, the rejection for an NaCl aqueous solution of 0.05% in concentration is at least 95%, and the permeate flow rate is not more than 0.6 m³/m²·day.

Pretreatment and desalination in the fresh water generator shown in FIG. 1 are now described. In pretreatment and desalination, the water feed valve 11 is opened while the bypass valve 12 and the flushing valve 9 are closed.

Raw water is prepared from water such as service water or industrial water fed with a prescribed pressure or well water having a pressure resulting from a draw pump.

In pretreatment, the raw water fed by the raw water feed pipe 1 is fed into the active carbon cartridge 2. The active carbon cartridge 2 removes residual chlorine contained in the fed raw water. Water permeating the active carbon cartridge 2 is fed into the fresh water generating cartridge 4 through the pretreated water feed pipe 3 as pretreated water.

The pretreated water is desalinated by the fresh water generating cartridge 4 and separated into permeated water from which impurities are removed and concentrated water in which impurities are concentrated. The permeated water is discharged from the fresh water generating cartridge 4 as treated water through the permeated water outlet pipe 5 connected with the permeated water outlet of the fresh water generating cartridge 4. The concentrated water is discharged from the fresh water generating cartridge 4 through the concentrated water outlet pipe 7 connected with the concentrated water outlet of the fresh water generating cartridge 4.

The pressure regulating valve 6 provided on the concentrated water outlet pipe 7 is so set that the concentrate flow rate is below a prescribed level. Thus, the concentrate flow rate is suppressed while the permeate flow rate is increased.

The pressure regulating valve 6 is so set that the ratio b/a of the flow rate b of the permeated water obtained from the fresh water generating cartridge 4 to the flow rate a of the raw water fed to the fresh water generating cartridge 4 is greater than 0.5 (b/a>0.5). In this case, the permeated water is efficiently and economically obtained with a recovery higher than 50% with respect to the fed raw water.

In the aforementioned fresh water generator, raw water having a pressure of at least 0.3 kgf/cm² and not more than 3 kgf/cm² can be fed to the fresh water generating cartridge 4 in a non-powered manner without employing a pressure pump, to be efficiently desalinated.

The timer 10 controls the bypass valve 12 to automatically open the bypass valve 12 for a prescribed time during interruption of fresh water generation work (during shutdown of the fresh water generator) or to automatically open the bypass valve 12 by a prescribed time at a prescribed time interval during fresh water generation work (during operation of the fresh water generator). When the bypass valve 12 is opened, the water feed valve 11 may be closed or opened. Control of closing the water feed valve 11 only when interrupting fresh water generation work is preferable due to its simplicity.

Thus, raw water containing residual chlorine having a bactericidal effect is fed into the fresh water generating cartridge 4 through the bypass pipe 13. Consequently, propagation of bacteria can be suppressed in the fresh water generating cartridge 4.

When the bypass valve 12 is periodically opened during shutdown of the fresh water generator, the fresh water generating cartridge 4 is disinfected and sterilized so that propagation of bacteria can be suppressed in the fresh water generating cartridge 4 during shutdown of the fresh water generator.

When the bypass valve 12 is periodically opened during operation of the fresh water generator, the fresh water generating cartridge 4 is disinfected and sterilized so that propagation of bacteria in the fresh water generating cartridge 4 can be suppressed during operation of the fresh water generator.

The bypass valve 12 may be non-periodically opened during operation of the fresh water generator. In this case, the bypass valve 12 is opened when the quality of the permeated water is deteriorated by propagation of bacteria, for example. Thus, the fresh water generating cartridge 4 can be disinfected and sterilized for suppressing deterioration of the quality of the permeated water.

Further, the bypass valve 12 may be opened simultaneously with restart of interrupted fresh water generation work (when restarting operation of the fresh water generator). Alternatively, the bypass valve 12 may be opened simultaneously with interruption of fresh water generation work (simultaneously with shutdown of the fresh water generator). In this case, operation of the fresh water generator may be restarted by turning on a main power source for the fresh water generator and operating a control circuit, or by turning on a driving switch after turning on the main power source. The control circuit, including the timer 10 shown in FIG. 1, controls the bypass valve 12, the flushing valve 9 and the remaining automatic valves. The driving switch is employed for instructing the control circuit to start operation. A stop switch instructs the control circuit to stop operation.

If the bypass valve 12 is opened when restarting operation of the fresh water generator, bacteria propagating in the fresh water generating cartridge 4 during shutdown of the fresh water generator can be disinfected and sterilized. After restarting operation of the fresh water generator while opening the bypass valve 12, the bypass valve 12 is closed for performing ordinary operation. Thus, propagation of bacteria in the fresh water generating cartridge 4 can be suppressed during operation of the fresh water generator.

When the bypass valve 12 is opened simultaneously with shutdown of the fresh water generator, bacteria propagating in the fresh water generating cartridge 4 during operation of the fresh water generator can be disinfected and sterilized. After feeding raw water while opening the bypass valve 12 simultaneously with shutdown of the fresh water generator, the bypass valve 12 is closed for stopping the fresh water generator. Thus, propagation of bacteria in the fresh water generating cartridge 4 can be suppressed during shutdown of the fresh water generator.

When the bypass valve 12 is opened during or simultaneously with shutdown of the fresh water generator for feeding raw water containing residual chlorine into the fresh water generating cartridge 4, the fed raw water passes through the fresh water generating cartridge 4 and is thereafter discharged from the fresh water generating cartridge 4 through the concentrated water outlet pipe 7. In this case, the raw water is guided into the concentrated water outlet pipe 7 by closing the permeated water path, for example.

The time interval for opening the bypass valve 12 is preferably at least 10 minutes and not more than 12 hours. If the time interval is longer than 12 hours, the effect of residual chlorine contained in the raw water fed to the fresh water generating cartridge 4 through the bypass pipe 13 is lost and propagation of bacteria is prompted. If the time interval is shorter than 10 minutes, on the other hand, the amount of wastefully discharged raw water is uneconomically increased.

The time for opening the bypass valve 12 is preferably at least 5 seconds and not more than 5 minutes, more preferably at least 15 seconds and not more than 2 minutes. If the time for opening the bypass valve 12 is shorter than 5 seconds, propagation of bacteria in the fresh water generating cartridge 4 cannot be sufficiently suppressed. If the time for opening the bypass valve 12 is longer than 5 minutes, on the other hand, the reverse osmosis membrane in the fresh water generating cartridge 4 may be damaged.

Washing of the fresh water generating cartridge 4 is now described. In order to wash the fresh water generating cartridge 4, the following flushing is performed:

In washing, the flushing valve 9 provided on the wash water pipe 8 is first opened. Thus, the concentrated water, the flow rate of which is suppressed by the pressure regulating valve 6 in the aforementioned desalination, is discharged through the wash water pipe 8 in a large volume. Thus, the linear velocity on the surface of the reverse osmosis membrane of the fresh water generating cartridge 4 is increased so that impurities remaining on the membrane surface can be discharged from the fresh water generating cartridge 4. Referring to FIG. 1, the timer 10 controls the flushing valve 9 to automatically open the flushing valve 9 by a prescribed time at a prescribed time interval.

For example, the timer 10 may be set to automatically open the flushing valve 9 for a prescribed time when restarting interrupted fresh water generation work (when restarting operation of the fresh water generator). In this case, flushing is performed when restarting operation of the fresh water generator, and thereafter the flushing valve 9 is closed for performing ordinary operation. Alternatively, the timer 10 may be set to automatically open the flushing valve 9 by a prescribed time at a prescribed time interval during interruption of fresh water generation work (during shutdown of fresh water generator).

If the flushing valve 9 is opened when restarting operation of the fresh water generator or the flushing valve 9 is periodically opened during shutdown of the fresh water generator, contaminants such as fungi generated and deposited in the fresh water generating cartridge 4 and impurities remaining on the membrane surface during shutdown of the fresh water generator can be discharged from the fresh water generating cartridge 4 by flushing.

In addition to the above, the flushing valve 9 may be periodically opened during operation of the fresh water generator. Alternatively, the flushing valve 9 may be opened simultaneously with shutdown of the fresh water generator for performing flushing and thereafter closed for stopping operation. In this case, contaminants such as fungi generated and deposited in the fresh water generating cartridge 4 and impurities remaining on the membrane surface during operation of the fresh water generator can be discharged from the fresh water generating cartridge 4 by flushing. Further, the flushing valve 9 may be opened when the quality of the permeated water is deteriorated during operation of the fresh water generator. Also when the flushing valve 9 is non-periodically opened during operation of the fresh water generator, an effect similar to the above can be attained.

If the ratio c/d of the time interval c for opening the bypass valve 12 to the time interval d for opening the flushing valve 9 is less than 1, the raw water containing residual chlorine is frequently fed to the fresh water generating cartridge 4 to result in deterioration of the quality of the permeated water. Therefore, the ratio c/d of the time interval c for opening the bypass valve 12 to the time interval d for opening the flushing valve 9 is preferably in excess of 1.

In the aforementioned fresh water generator, the raw water containing residual chlorine is fed to the fresh water generating cartridge 4 by opening the bypass valve 12, whereby propagation of bacteria in the fresh water generating cartridge 4 can be suppressed. Consequently, the permeated water is prevented from deterioration of quality resulting from propagation of bacteria.

The performance of the reverse osmosis membrane of the fresh water generating cartridge 4 can be maintained by flushing, whereby the quality of the permeated water is not deteriorated and the permeate flow rate is not reduced over time even if the linear velocity on the surface of the membrane in desalination is small. Therefore, the ratio b/a of the flow rate b of the permeated water obtained from the fresh water generating cartridge 4 to the flow rate a of the raw water fed to the fresh water generating cartridge 4 can be so set that b/a>0.5.

Figure 8:
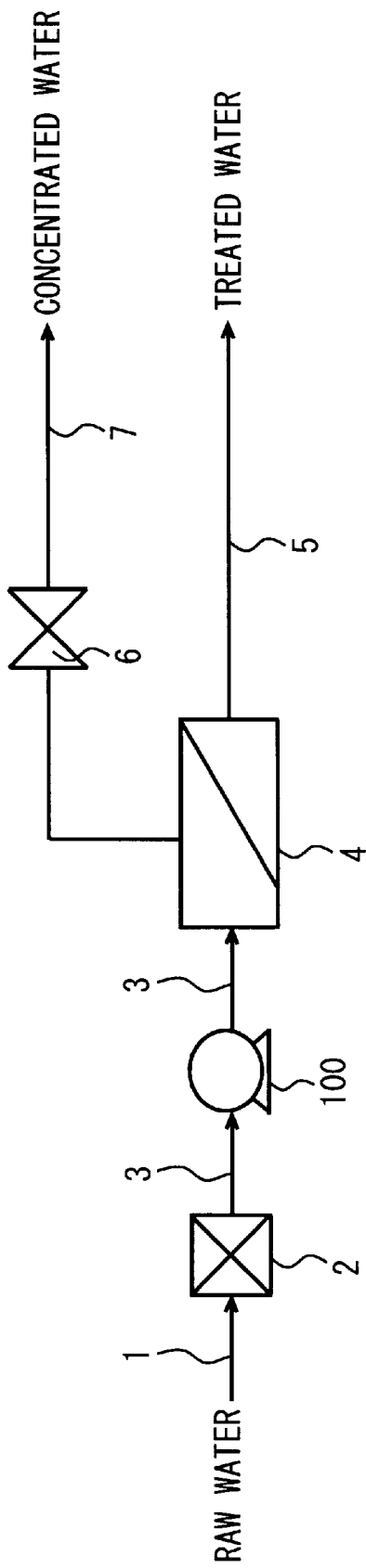
FIG. 8 is a block diagram showing an exemplary conventional fresh water generator having a pressure pump.

In the conventional fresh water generator shown in FIG. 8, on the other hand, the permeate flow rate b must be minimized so that the concentrate flow rate (a–b) approaches the raw water flow rate a for maintaining the membrane performance by increasing the linear velocity on the surface of the membrane in desalination with the fresh water generating cartridge 4. When the ratio b/a of the permeate flow rate b to the raw water flow rate a is minimized to 0.1 or 0.2, for example, it follows that the linear velocity on the surface of the reverse osmosis membrane is maintained in a state close to that on the inlet for the raw water. In general, however, the concentrated water is discharged as waste water and hence the target permeate flow rate b is uneconomically reduced if the ratio b/a of the permeate flow rate b to the raw water flow rate a is small.

In the fresh water generator shown in FIG. 1, on the other hand, the ratio b/a of the permeate flow rate b to the raw water flow rate a can be increased beyond 0.5, whereby an economical permeate flow rate can be obtained.

In the aforementioned fresh water generator requiring no pressure pump, as hereinabove described, the fresh water generating cost and the price of the fresh water generator can be suppressed while efficient desalination can be stably performed over a long period. Thus, fresh water can be generated at a low cost with no noise.

Figure 2:
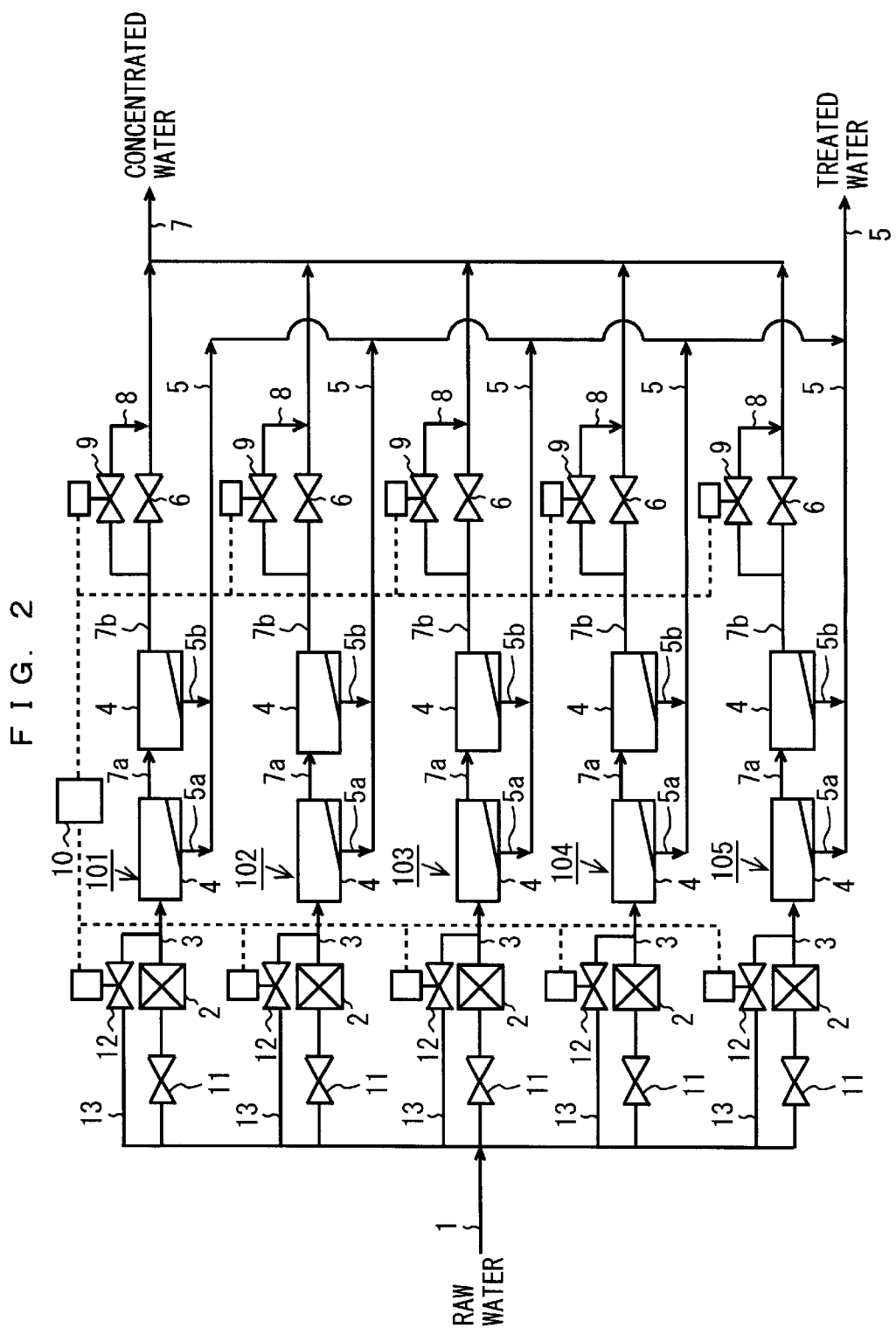
FIG. 2 is a block diagram showing a fresh water generator according to a second embodiment of the present invention.

FIG. 2 is a block diagram showing a fresh water generator according to a second embodiment of the present invention. The fresh water generator shown in FIG. 2 employs active carbon cartridges 2 for pretreatment. Further, 10 fresh water generating cartridges 4 are employed for desalination.

Each pair of fresh water generating cartridges 4 are serially connected with each other to form a single unit, thereby forming five units 101 to 105. The five units 101 to 105 are arranged in parallel with each other.

A raw water feed pipe 1 is connected to raw water inlets of the preceding stage fresh water generating cartridges 4 of the units 101 to 105 through water feed valves 11, the active carbon cartridges 2 and pretreated water feed pipes 3 respectively. Bypass pipes 13 are connected to bypass the water feed valves 11 and the active carbon cartridges 2, and bypass valves 12 are inserted in the bypass pipes 13. The bypass valves 12 are formed by automatic valves. Concentrated water outlets of the preceding stage fresh water generating cartridges 4 of the units 101 to 105 are connected to raw water inlets of the succeeding stage fresh water generating cartridges 4 of the units 101 to 105 through concentrated water outlet pipes 7a. Concentrated water outlets of the succeeding stage fresh water generating cartridges 4 of the units 101 to 105 are connected to a concentrated water outlet pipe 7 through concentrated water outlet pipes 7b. Pressure regulating valves 6 are inserted in the concentrated water outlet pipes 7b. Flushing valves 9 are connected in parallel with the pressure regulating valves 6 through wash water pipes 8. A common timer 10 independently or simultaneously controls opening and closing operations of the five flushing valves 9 and the five bypass valves 12 respectively. Permeated water outlets of the preceding and succeeding stage fresh water generating cartridges 4 of the units 101 to 105 are connected to a permeated water outlet pipe 5 through permeated water outlet pipes 5a and 5b respectively.

Each fresh water generating cartridge 4 is prepared from the reverse osmosis membrane module described with reference to the fresh water generator shown in FIG. 1.

Pretreatment and desalination in the fresh water generator shown in FIG. 2 are now described. In pretreatment and desalination, the water feed valves 11 are opened while the bypass valves 12 and the flushing valves 9 are closed. Raw water is prepared from that described with reference to the fresh water generator shown in FIG. 1.

In pretreatment, the raw water feed pipe 1 feeds raw water into each active carbon cartridge 2. Residual chlorine contained in the fed raw water is removed in the active carbon cartridge 2. Water permeating the active carbon cartridge 2 passes through each pretreated water feed pipe 3 as pretreated water and is fed into the preceding stage fresh water generating cartridge 4 of each of the units 101 to 105. The pretreated water is desalinated in the preceding stage fresh water generating cartridge 4 of each of the units 101 to 105 and separated into permeated water from which impurities are removed and concentrated water in which impurities are concentrated. The concentrated water passes through each concentrated water outlet pipe 7a connected to the concentrated water outlet of the preceding stage fresh water generating cartridge 4 of each of the units 101 to 105, and is fed into the succeeding stage fresh water generating cartridge 4 of each of the units 101 to 105. On the other hand, the permeated water passes through each permeated water outlet pipe 5a connected to the permeated water outlet of the preceding stage fresh water generating cartridge 4 of each of the units 101 to 105, further passes through the permeated water outlet pipe 5 and is discharged as treated water.

In the succeeding stage fresh water generating cartridge 4 of each of the units 101 to 105, the concentrated water from the preceding stage fresh water generating cartridge 4 is further desalinated and separated into permeated water from which impurities are removed and concentrated water in which impurities are concentrated. The permeated water passes through each permeated outlet pipe 5b connected to the permeated water outlet of the succeeding stage fresh water generating cartridge 4 of each of the units 101 to 105, further passes through the permeated water outlet pipe 5 and is discharged as treated water. On the other hand, the concentrated water passes through each concentrated water outlet pipe 7b connected to the concentrated water outlet of the succeeding stage fresh water generating cartridge 4 of each of the units 101 to 105, further passes through the concentrated water outlet pipe 7 and is discharged. The pressure regulating valve 6 provided on each concentrated water outlet pipe 7b is so set that the flow rate of the concentrated water from the preceding and succeeding stage fresh water generating cartridges 4 of each of the units 101 to 105 is below a prescribed level. Thus, the concentrated water flow rate is suppressed and the permeate flow rate is increased.

Each pressure regulating valve 6 is so set that the ratio b/a of the flow rate b of the permeated water obtained from the preceding and succeeding stage fresh water generating cartridges 4 of each of the units 101 to 105 to the flow rate a of the raw water fed to the preceding stage fresh water generating cartridge is greater than 0.5 (b/a>0.5 ). In this case, the permeated water is efficiently and economically obtained with a recovery higher than 50%.

In the aforementioned fresh water generator, raw water having a pressure of not more than 3 kgf/cm$^2$ can be fed to the preceding and succeeding stage fresh water generating cartridges 4 of the units 101 to 105 in a non-powered manner without employing a pressure pump, to be efficiently desalinated.

The timer 10 controls each bypass valve 12 to automatically open the bypass valve 12 for a prescribed time during interruption of fresh water generation work or to automatically open the bypass valve 12 by a prescribed time at a prescribed time interval during fresh water generation work. The water feed valve 11 is closed when the bypass valve 12 is opened.

Thus, raw water containing residual chlorine having a bactericidal effect is fed into each fresh water generating cartridge 4 through the bypass pipe 13. Consequently, propagation of bacteria can be suppressed in the fresh water generating cartridge 4.

When the bypass valve 12 is periodically opened during interruption of fresh water generation work (during shutdown of the fresh water generator), the fresh water generating cartridge 4 is disinfected and sterilized so that propagation of bacteria in the fresh water generating cartridge can be suppressed during shutdown of the fresh water generator.

When the bypass valve 12 is periodically opened during operation of fresh water generation work (during operation of the fresh water generator), on the other hand, the fresh water generating cartridge 4 is disinfected and sterilized so that propagation of bacteria in the fresh water generating cartridge can be suppressed during operation of the fresh water generator.

The bypass valve 12 may be non-periodically opened during operation of the fresh water generator. In this case, the bypass valve 12 is opened when the quality of the permeated water is deteriorated by propagation of bacteria, for example. Thus, the fresh water generating cartridge 4 can be disinfected and sterilized for suppressing deterioration of the quality of the permeated water.

Further, the bypass valve 12 may be opened simultaneously with restart of interrupted fresh water generation work (when restarting operation of the fresh water generator). Alternatively, the bypass valve 12 may be opened simultaneously with interruption of fresh water generation work (simultaneously with shutdown of the fresh water generator). "Restart" of fresh water generation work is described in relation to the fresh water generator shown in FIG. 1.

If the bypass valve 12 is opened when restarting operation of the fresh water generator, bacteria propagating in the fresh water generating cartridge 4 during shutdown of the fresh water generator can be disinfected and sterilized. After restarting operation of the fresh water generator while opening the bypass valve 12, the bypass valve 12 is closed for performing ordinary operation. Thus, propagation of bacteria in the fresh water generating cartridge 4 can be suppressed during operation of the fresh water generator.

When the bypass valve 12 is opened simultaneously with shutdown of the fresh water generator, bacteria propagating in the fresh water generating cartridge 4 during operation the fresh water generator can be disinfected and sterilized. After feeding raw water while opening the bypass valve 12 simultaneously with shutdown of the fresh water generator, the bypass valve 12 is closed for stopping the fresh water generator. Thus, propagation of bacteria in the fresh water generating cartridge 4 can be suppressed during shutdown of the fresh water generator.

When the bypass valve 12 is opened during or simultaneously with shutdown of the fresh water generator for feeding raw water containing residual chlorine into the fresh water generating cartridge 4, the fed raw water passes through the fresh water generating cartridge 4 and is thereafter discharged from the fresh water generating cartridge 4 through the concentrated water outlet pipe 7. In this case, the raw water is guided into the concentrated water outlet pipe 7 by closing the permeated water path, for example.

Washing of the preceding and succeeding stage fresh water generating cartridges 4 of the units 101 to 105 is now described. The fresh water generating cartridges 4 are washed by flushing.

In washing, the flushing valves 9 provided on the wash water pipes 8 are simultaneously opened. Thus, the concentrated water, the flow rate of which has been suppressed by the pressure regulating valves 6 in the aforementioned desalination, is discharged through the wash water pipes 8 and the concentrated water outlet pipe 7 in a large volume. Thus, the linear velocity on the surfaces of the reverse osmosis membranes of the preceding and succeeding stage fresh water generating cartridges 4 of the units 101 to 105 is increased so that impurities remaining on the membrane surfaces can be discharged from the preceding and succeeding stage fresh water generating cartridges 4. Referring to FIG. 2, the common timer 10 controls the flushing valves 9 to simultaneously open the flushing valves 9 by a prescribed time at a prescribed time interval.

For example, the timer 10 may be set to automatically open the flushing valves 9 for a prescribed time when restarting interrupted fresh water generation work (when restarting operation of the fresh water generator). In this case, flushing is performed when restarting operation of the fresh water generator, and thereafter the flushing valves 9 are closed for performing ordinary operation. Alternatively, the timer 10 may be set to automatically open the flushing valves 9 by a prescribed time at a prescribed time interval during interruption of fresh water generation work (during shutdown of the fresh water generator).

If the flushing valves 9 are opened when restarting operation or the flushing valves 9 are periodically opened during shutdown, contaminants such as fungi generated and deposited in the fresh water generating cartridges 4 and impurities remaining on the membrane surfaces during shutdown of the fresh water generator can be discharged from the fresh water generating cartridges 4 by flushing.

In addition to the above, the flushing valves 9 may be periodically opened during operation of the fresh water generator. Alternatively, the flushing valves 9 may be opened simultaneously with shutdown of the fresh water generator and thereafter closed for stopping operation. In this case, contaminants such as fungi generated and deposited in the fresh water generating cartridges 4 and impurities remaining on the membrane surfaces during operation of the fresh water generator can be discharged from the fresh water generating cartridges 4 by flushing. Further, the flushing valves 9 may be opened when the quality of the permeated water is deteriorated during operation of the fresh water generator. Also when the flushing valves 9 are non-periodically opened during operation of the fresh water generator, an effect similar to the above can be attained.

The time interval for opening the bypass valves 12, the time for opening the bypass valves 12 and the ratio c/d of the time interval c for opening the bypass valves 12 to the time interval d for opening the flushing valves 9 are the same as to those described with reference to the fresh water generator shown in FIG. 1.

In the aforementioned fresh water generator, raw water containing residual chlorine is fed to the 10 fresh water generating cartridges 4 by opening the bypass valves 12, whereby propagation of bacteria in the fresh water generating cartridges 4 can be suppressed. Consequently, the permeated water is prevented from deterioration of quality resulting from propagation of bacteria.

The performance of the reverse osmosis membranes of the preceding and succeeding stage fresh water generating cartridges 4 of the units 101 to 105 can be maintained by flushing, whereby the quality of the permeated water is not deteriorated and the permeate flow rate is not reduced over time even if the linear velocity on th e membrane surfaces in desalination is small. Therefore, the ratio b/a of the flow rate b of the permeated water obtained from the preceding and succeeding stage fresh water generating cartridges 4 of the units 101 to 105 to the flow rate a of the raw water fed to the preceding stage fresh water generating cartridges 4 can be so set that b/a>0.5.

In the aforementioned fresh water generator requiring no pressure pump, as hereinabove described, the fresh water generating cost and the price of the fresh water generator can be suppressed while efficient desalination can be stably performed over a long period. Thus, fresh water can be generated at a low cost with no noise.

FIG. 2 shows an exemplar y structure of the fresh water generator provided with a plurality of fresh water generating cartridges 4, and another structure is also employable. When a plurality of fresh water generating cartridges 4 are provided in parallel or in series with each other, a flushing valve may be stored in each fresh water generating cartridge 4 or may be provided on the rearmost one of connected portions between concentrated liquid paths of the plurality of fresh water generating cartridges 4. Further, a prescribed number of fresh water generating cartridges 4 arranged in parallel or in series with each other with a flushing valve provided on the rearmost one of connected portions between the concentrated liquid paths thereof may be integrated into a unit so that a plurality of such units are arranged in parallel or in series with each other.

Figure 3:
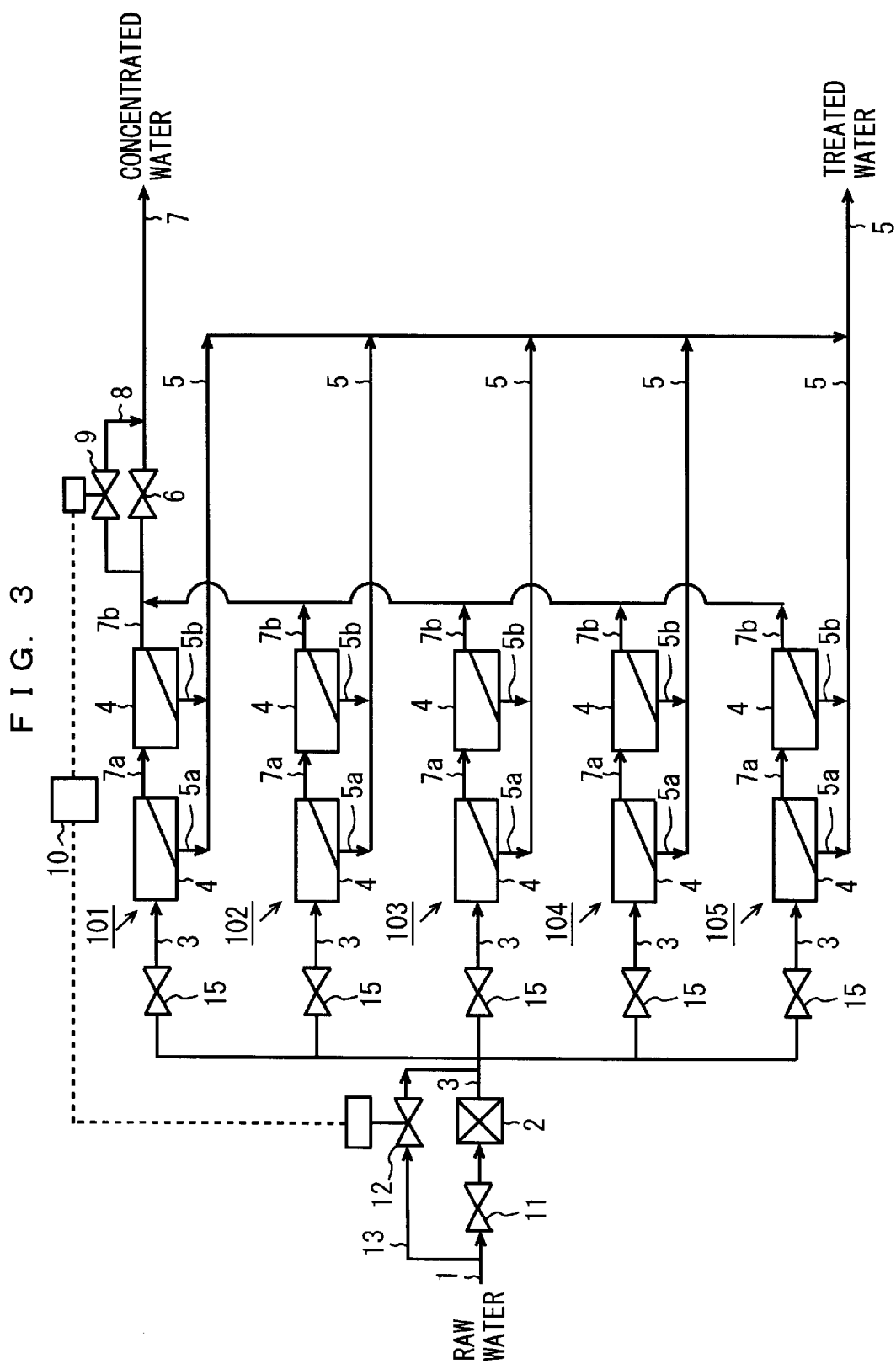
FIG. 3 is a block diagram showing a fresh water generator according to a third embodiment of the present invention.
Figure 4:
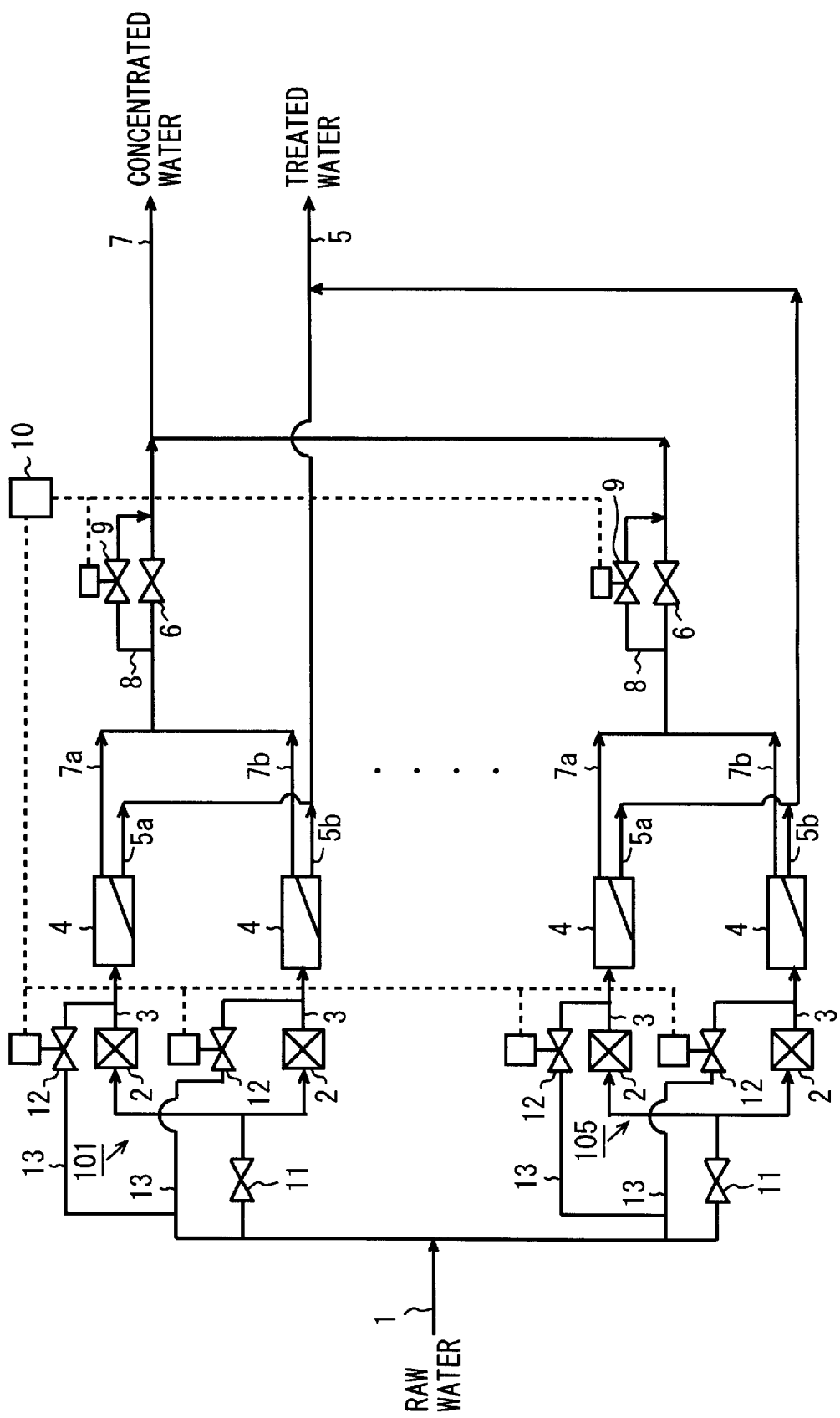
FIG. 4 is a block diagram showing a fresh water generator according to a fourth embodiment of the present invention.
Figure 5:
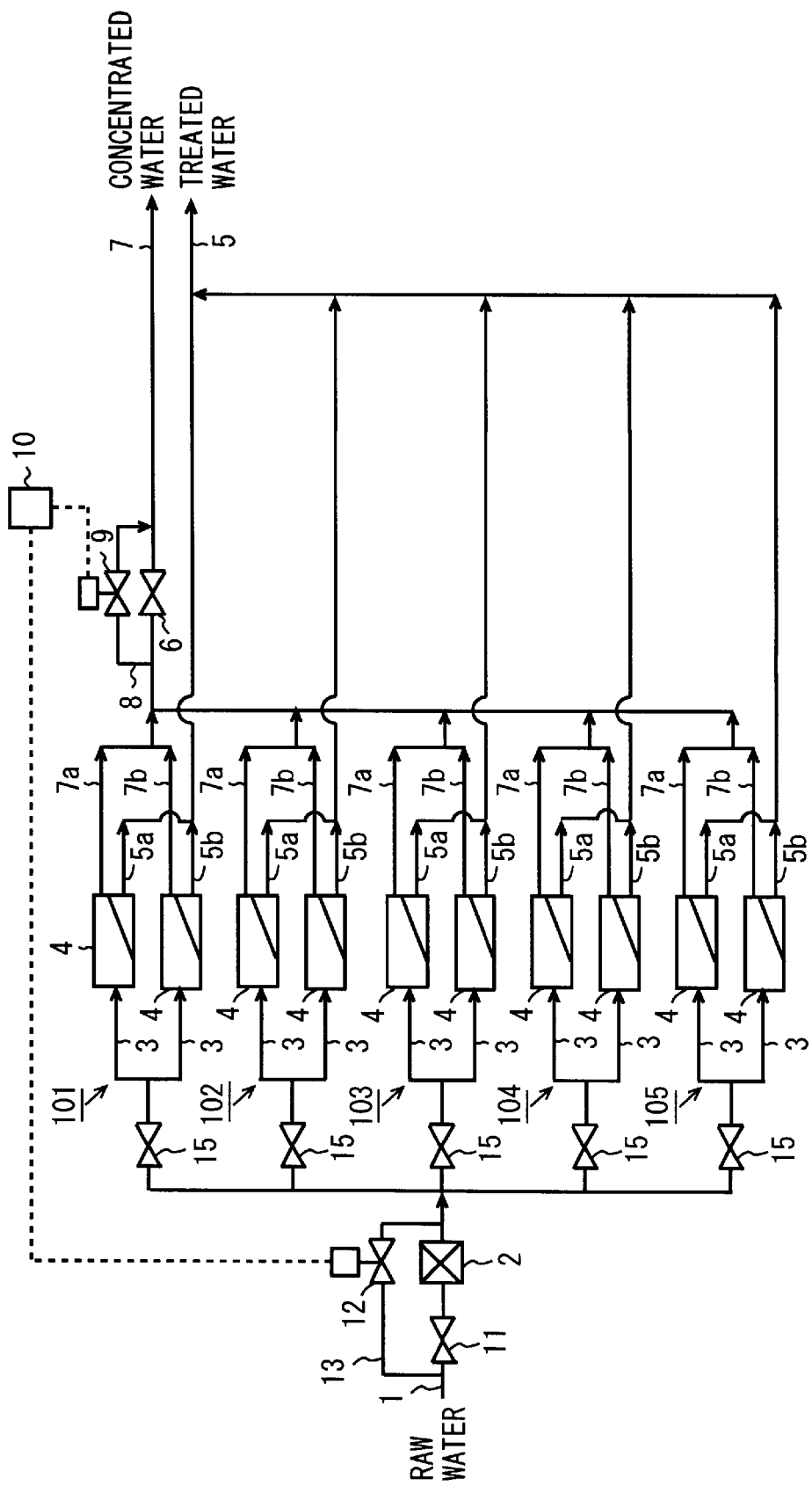
FIG. 5 is a block diagram showing a fresh water generator according to a fifth embodiment of the present invention.
Figure 6:
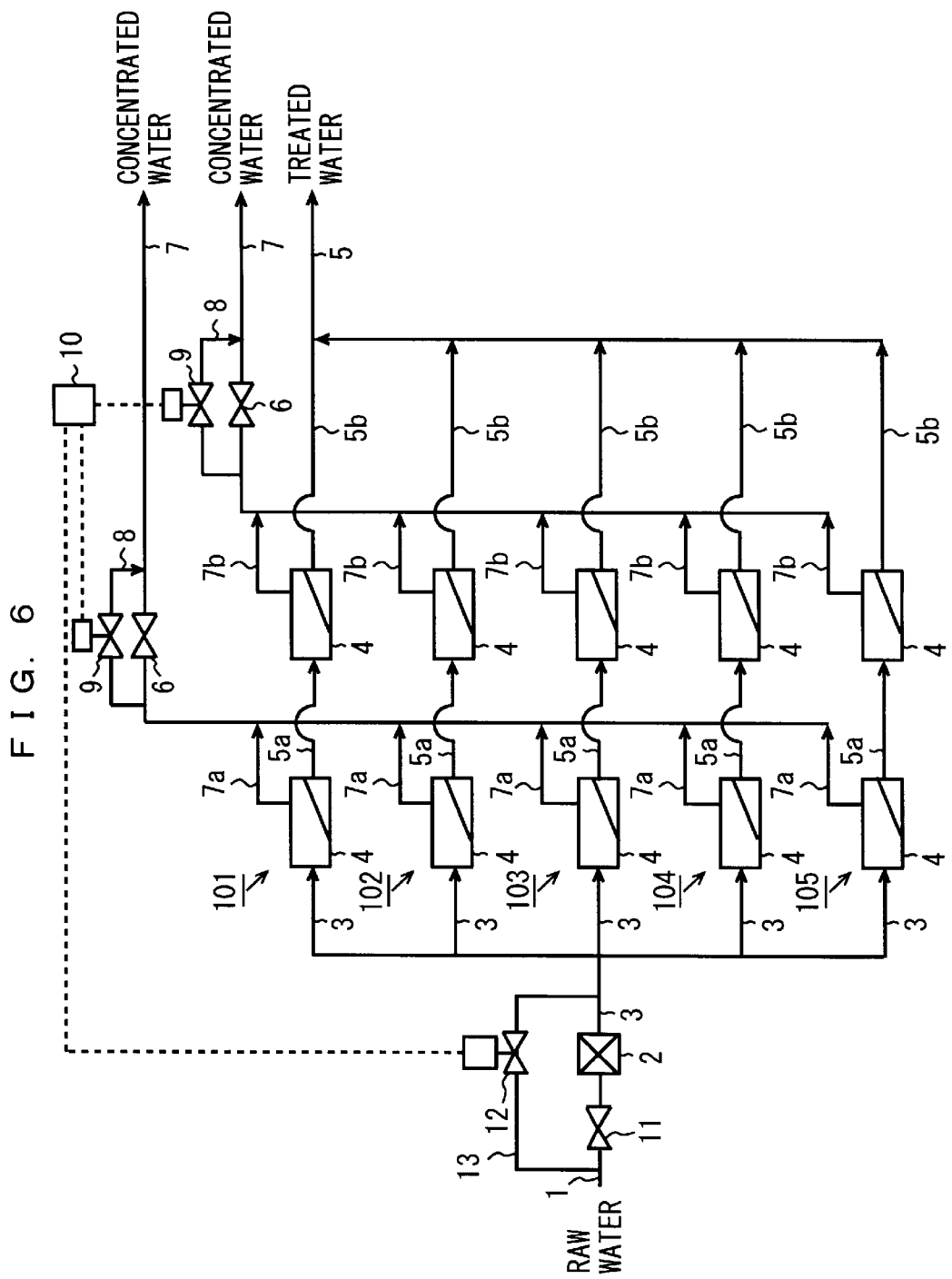
FIG. 6 is a block diagram showing a fresh water generator according to a sixth embodiment of the present invention.

As a fresh water generator according to a third embodiment of the present invention, raw water inlets of preceding stage fresh water generating cartridges 4 of five units 101 to 105 may be connected to a common active carbon cartridge 2 through opening/closing valves 15 respectively while a common pressure regulating valve 6 and a common flushing valve 9 may be connected to concentrated water outlets of succeeding stage fresh water generating cartridges 4 of the five units 101 to 105 as shown in FIG. 3, for example. As a fresh water generator according to a fourth embodiment of the present invention, two fresh water generating cartridges 4 of each of units 101 to 105 may be connected in parallel with each other so that raw water inlets of the two fresh water generating cartridges 4 connected in parallel are connected to a common raw water feed pipe 1 through active carbon cartridges 2 and a common water feed valve 11, as shown in FIG. 4. As a fresh water generator according to a fifth embodiment of the present invention, further, two fresh water generating cartridges 4 of each of units 101 to 105 may be connected in parallel with each other so that raw water outlets of the pairs of fresh water generating cartridges 4 connected in parallel are connected to a common active carbon cartridge 2 through opening/closing valves 15 while a common pressure regulating valve 6 and a common flushing valve 9 are connected to concentrated water outlets of the fresh water generating cartridges 4 of the five units 101 to 105, as shown in FIG. 5. As a fresh water generator according to a sixth embodiment of the present invention, a permeated water outlet pipe 5a of a preceding stage fresh water generating cartridge 4 may be connected to a raw water inlet of a succeeding stage fresh water generating cartridge 4 in each of units 101 to 105 so that the two fresh water generating cartridges 4 of each of the units 101 to 105 are connected in series with each other, raw water inlets of the preceding stage fresh water generating cartridges 4 of the five units 101 to 105 are connected to a common active carbon cartridge 2, a common pressure regulating valve 6 and a common flushing valve 9 are connected to concentrated water outlets of the preceding stage fresh water generating cartridges 4 of the five units 101 to 105, and another common pressure regulating valve 6 and another common flushing valve 9 are connected to concentrated water outlets of the succeeding stage fresh water generating cartridges 4 of the five units 101 to 105, as shown in FIG. 6.

Figure 7:
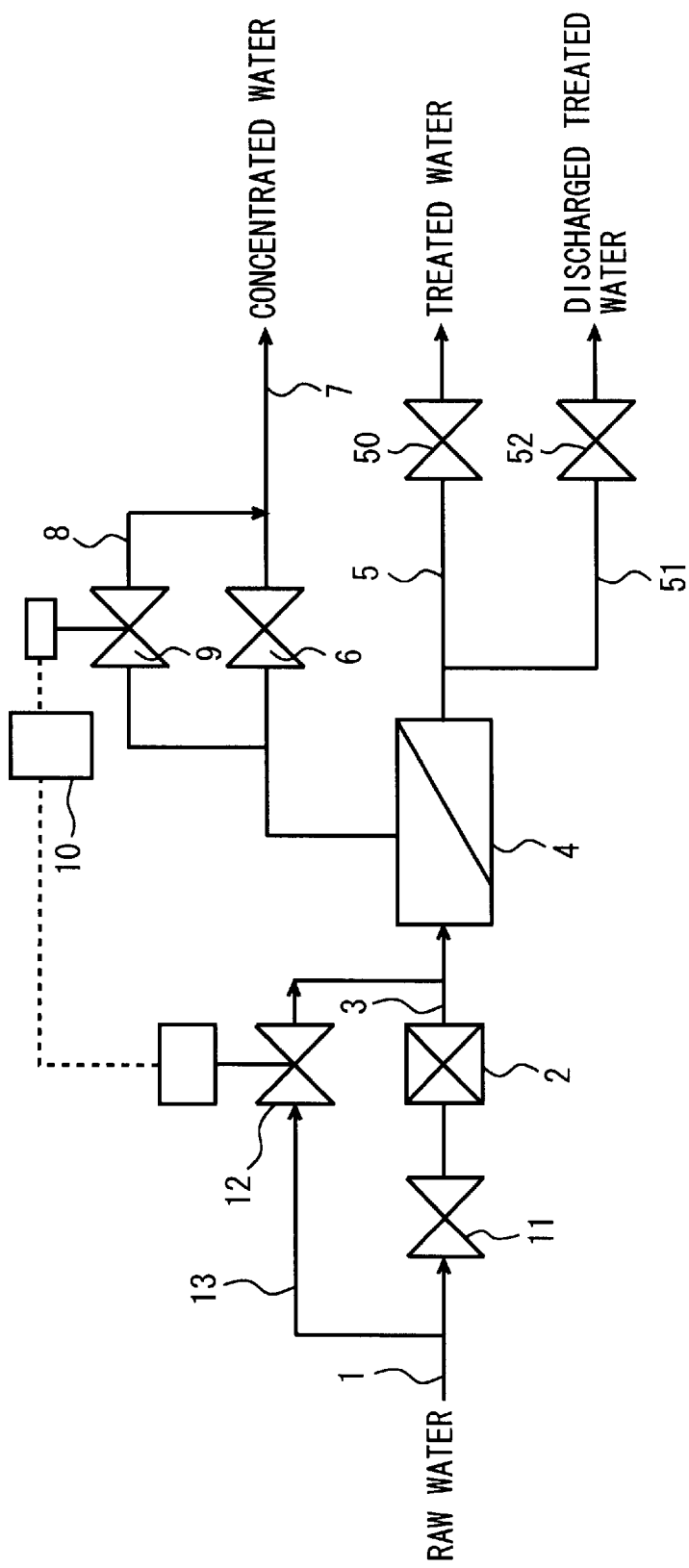
FIG. 7 is a block diagram showing a fresh water generator according to a seventh embodiment of the present invention.

FIG. 7 is a block diagram showing a fresh water generator according to a seventh embodiment of the present invention. The fresh water generator shown in FIG. 7 is similar in structure to the fresh water generator shown in FIG. 1, except the following points:

In the fresh water generator shown in FIG. 7, a permeated water discharge pipe 51 having a permeated water discharge valve 52 inserted therein is connected to a permeated water outlet pipe 5. A permeated water outlet valve 50 is inserted in the permeated water outlet pipe 5. In this case, the permeated water outlet valve 50 and the permeated water discharge valve 52 may be automatic valves, opening and closing operations of which are independently or simultaneously controlled by a timer or the like respectively. In this embodiment, the permeated water discharge pipe 51 corresponds to the permeated liquid discharge path.

The fresh water generator shown in FIG. 7 performs pretreatment and desalination similarly to the fresh water generator shown in FIG. 1. In pretreatment and desalination, the permeated water outlet valve 50 of the permeated water outlet pipe 5 is opened while the permeated water discharge valve 52 of the permeated water discharge pipe 51 is closed.

In the aforementioned fresh water generator, raw water having a pressure of at least 0.3 kgf/cm$^2$ and not more than 3 kgf/cm$^2$ can be fed to a fresh water generating cartridge 4 in a non-powered manner without employing a pressure pump to be efficiently desalinated.

A pressure regulating valve 6 is so set that the ratio b/a of the flow rate b of permeated water obtained from the fresh water generating cartridge 4 to the flow rate a of raw water fed to the fresh water generating cartridge 4 is greater than 0.5 (b/a>0.5 ), whereby permeated water can be obtained with a recovery higher than 50% with respect to the fed raw water. Thus, the fresh water generator is efficient and economical.

In the fresh water generator, raw water containing residual chlorine is fed into the fresh water generating cartridge 4 through a bypass pipe 13 similarly to the fresh water generator shown in FIG. 1, for disinfecting and sterilizing the fresh water generating cartridge 4. Consequently, propagation of bacteria in the fresh water generating cartridge 4 can be suppressed.

When a bypass valve 12 is opened simultaneously with shutdown of the fresh water generator or the bypass valve 12 is periodically opened during shutdown of the fresh water generator, the raw water fed through the bypass pipe 13 may be discharged through the permeated water outlet pipe 5 and the permeated water discharge pipe 51 after passing through the fresh water generating cartridge 4. In this case, the permeated water outlet valve 50 of the permeated water outlet pipe 5 is closed while the permeated water discharge valve 52 of the permeated water discharge pipe 51 is opened. Thus, the permeated water outlet pipe 5 is disinfected and sterilized by the raw water containing residual chlorine. Consequently, propagation of bacteria can be suppressed in the permeated water outlet pipe 5 during shutdown of the fresh water generator, and the permeated water taken out from the permeated water outlet pipe 5 can be prevented from mixture with contaminants.

The time interval for opening the bypass valve 12 and the time for opening the bypass valve 12 are the same as those described with reference to the fresh water generator shown in FIG. 1.

In the aforementioned fresh water generator, flushing is performed through a wash water pipe 8 similarly to the fresh water generator shown in FIG. 1. Thus, impurities remaining on the surface of a reverse osmosis membrane of the fresh water generating cartridge 4 can be discharged from the fresh water generating cartridge 4.

The ratio c/d of the time interval c for opening the bypass valve 12 to the time interval d for opening a flushing valve 9 is the same as that described with reference to the fresh water generator shown in FIG. 1.

In the aforementioned fresh water generator, further, the permeated water discharge valve 52 is opened and the permeated water outlet valve 50 is closed when restarting interrupted fresh water generation work (when restarting operation of the fresh water generator). In this case, permeated water is discharged from the fresh water generating cartridge 4 through the permeated water discharge pipe 51. Thus, the permeated water discharge valve 52 is opened when restarting operation of the fresh water generator for discharging the permeated water, and thereafter the permeated water discharge valve 52 is closed while the permeated water outlet valve 51 is opened for performing ordinary operation.

Due to the aforementioned discharge of the permeated water, contaminants such as fungi generated and deposited in the fresh water generating cartridge 4 and the permeated water outlet pipe 5 during shutdown of the fresh water generator can be discharged along with the permeated water. Consequently, the contaminants can be removed from the fresh water generating cartridge 4 and the permeated water outlet pipe 5, while the permeated water taken out through the permeated water outlet pipe 5 can be prevented from mixture with the contaminants.

In the aforementioned fresh water generator, raw water containing residual chlorine is fed to the fresh water generating cartridge 4 by periodically opening the bypass valve 12, whereby propagation of bacteria in the fresh water generating cartridge 4 can be suppressed. Consequently, the permeated water can be prevented from deterioration of quality resulting from propagation of bacteria.

Further, the performance of the reverse osmosis membrane of the fresh water generating cartridge 4 can be maintained by flushing, whereby the quality of the permeated water is not deteriorated even if the linear velocity on the membrane surface is small in desalination, and the permeate flow rate is not reduced over time. Therefore, the ratio b/a of the flow rate b of the permeated water obtained from the fresh water generating cartridge 4 to the flow rate a of the raw water fed to the fresh water generating cartridge 4 can be so set that b/a>0.5 as described above, and an economical permeate flow rate can be obtained.

In addition, contaminants can be discharged from the fresh water generating cartridge 4 and the permeated water outlet pipe 5 by the aforementioned discharge of the permeated water. Consequently, the performance of the reverse osmosis membrane of the fresh water generating cartridge 4 can be maintained while the permeated water is prevented from deterioration of quality.

In the aforementioned fresh water generator requiring no pressure pump, as hereinabove described, the fresh water generating cost and the price of the fresh water generator can be suppressed while efficient desalination can be stably performed over a long period. Thus, fresh water can be generated at a low cost with no noise.

While the permeated water discharge valve 52 is opened when restarting operation of the fresh water generator in the above description, the permeated water discharge valve 52 may alternatively be periodically opened during shutdown of the fresh water generator. Also in this case, contaminants such as fungi generated and deposited in the fresh water generating cartridge 4 and the permeated water outlet pipe 5 during shutdown of the fresh water generator can be discharged.

While the aforementioned fresh water generator is formed by a single fresh water generating cartridge 4, the fresh water generator may alternatively have a plurality of such fresh water generating cartridges 4 provided in parallel or in series with each other.

When a plurality of fresh water generating cartridges 4 are provided in parallel or in series with each other, the permeated water discharge pipe 51 having the permeated water discharge valve 52 inserted therein is connected to the rearmost one of connected portions between permeated water outlet pipes 5 of the fresh water generating cartridges 4. Further, the permeated water outlet valve 50 is inserted in the permeated water outlet pipe 5 downstream the connected portion of the permeated water discharge pipe 51. In addition, a prescribed number of fresh water generating cartridges 4 arranged in parallel or in series with each other with the aforementioned permeated water discharge pipe 51, permeated water discharge valve 52 and permeated water outlet valve 50 provided on the rearmost one of the connected portions between the permeated water outlet pipes 5 may be integrated into a unit so that a plurality of such units are arranged in parallel or in series with each other. Also in this case, no pressure pump is required but the fresh water generating cost and the price of the fresh water generator can be suppressed and efficient desalination can be stably performed over a long period, similarly to the fresh water generator shown in FIG. 7. Thus, fresh water can be generated at a low cost with no noise.

The treated water obtained by each of the fresh water generators shown in FIGS. 1 to 7 may be applied to wash water. The wash water is employed for improving the washing effect and preventing generation of surface residues in drying after washing. The obtained treated water may be applied to soft water for a boiler, soft water for preparing food, agricultural water for hydroponics, pure water for a laboratory, water for a humidifier or potable water. Further, the treated water may be fed to an ion exchanger or a continuous electric regenerative ion exchanger. In this case, the purity of the treated water is further improved and hence extrapure water is obtained. The term "continuous electric regenerative ion exchanger" indicates an apparatus continuously performing ion exchange with an externally fed current for electrodialysis employing no ion exchange membrane or electrolysis employing an ion exchange membrane.

EXAMPLES

Fresh water generators of Examples 1 to 8 and comparative examples 1 to 3 were operated as follows, to desalinate raw water. The raw water was prepared from service water in Kusatsu City, Shiga Prefecture. Table 1 shows the characteristics of service water.

TABLE 1

| Raw Water | Service Water, Kusatsu City, Shiga Pref. Water Temperature 22° C. Pressure 1 kgf/cm$^2$ Concentration of Residual Chlorine 0.5 mg/L Conductivity 150 µS/cm |
|---|---|

The fresh water generators of Examples 1 to 8 and comparative examples 1 to 3 were prepared from that shown in FIG. 1. A reverse osmosis membrane spiral wound type element LES90-D8 by Nitto Denko Corporation was employed for the fresh water generating cartridge 4. Table 2 shows the performance of th is reverse osmosis membrane spiral would type element.

TABLE 2

| LES 90-D8 by Nitto Denko Corporation (8 inches) | Membrane Area  37 m$^2$ 0.05% NaCl Aqueous Solution Rejection 98% Permeate Flow Rate 30 m$^3$/day (Water Temperature 25° C., Operating Pressure 5 kgf/cm$^2$) |
|---|---|

Example 1

The aforementioned service water was fed to the active carbon cartridge 2 at a flow rate of 6.5 L/min. for removing residual chlorine, and fresh water generation work was carried out in the fresh water generating cartridge 4 for 24 hours. Thereafter the water feed valve 11 was closed to stop feeding the service water to the active carbon cartridge 2, and fresh water generation work was interrupted for 48 hours. During interruption of fresh water generation work (during shutdown of the fresh water generator), the bypass valve 12 was fully opened for 30 seconds once in four hours, for feeding service water containing residual chlorine to the fresh water generating cartridge 4 and discharging water remaining in the fresh water generating cartridge 4 from the fresh water generating cartridge 4.

After interrupting fresh water generation work for 48 hours, the bypass valve 12 was closed and the water feed valve 11 was opened for feeding service water to the active carbon cartridge 2 and restarting fresh water generation work. In this case, the conductivity of permeated water obtained from the fresh water generating cartridge 4 was 10 µS/cm and the permeate flow rate was 4.5 L/min. When cultivating bacteria from the permeated water in accordance with Paragraph 63.2 for general bacteria in the JISK 0101 industrial water test method, the number of detected fungi was 0 CFU on the assumption that a single bacterium formed a single colony.

Example 2

The aforementioned service water was fed to the active carbon cartridge 2 at a flow rate of 6.5 L/min. for removing residual chlorine, and fresh water generation work was carried out in the fresh water generating cartridge 4 for 24 hours. In this case, the bypass valve 12 was fully opened for 30 seconds once an hour during fresh water generation work (during operation of the fresh water generator), for feeding service water containing residual chlorine to the fresh water generating cartridge 4 and discharging water remaining in the fresh water generating cartridge 4 from the fresh water generating cartridge 4. Thereafter the bypass valve 12 and the water feed valve 11 were closed to stop feeding service water to the active carbon cartridge, and fresh water generation work was interrupted for 3 hours.

After interrupting fresh water generation work for 3 hours, the water feed valve 11 was opened for feeding service water to the active carbon cartridge 2 and restarting fresh water generation work. In this case, the conductivity of permeated water obtained from the fresh water generating cartridge 4 was 10 µS/cm and the permeate flow rate was 4.5 L/min. The number of detected fungi was 0 CFU.

Example 3

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2. In this case, the bypass valve 12 was fully opened for 30 seconds simultaneously with interruption of fresh water generation work (simultaneously with shutdown of the fresh water generator) for feeding service water containing residual chlorine to the fresh water generating cartridge 4 and discharging water remaining in the fresh water generating cartridge 4 from the fresh water generating cartridge 4. Thereafter the bypass valve 12 was closed and fresh water generation work was interrupted for 3 hours.

After interrupting fresh water generation work for 3 hours, the water feed valve 11 was opened for feeding service water to the active carbon cartridge 2 and restarting fresh water generation work. In this case, the conductivity of permeated water obtained from the fresh water generating cartridge 4 was 11 µS/cm and the permeate flow rate was 4.5 L/min. The number of detected fungi was 0 CFU.

Example 4

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2 and fresh water generation work was interrupted for 48 hours.

After interrupting fresh water generation work for 48 hours, the bypass valve 12 was fully opened for 30 seconds when restarting fresh water generation work (restarting operation of the fresh water generator) for feeding service water containing residual chlorine to the fresh water generating cartridge 4 and discharging water remaining in the fresh water generating cartridge 4 from the fresh water generating cartridge 4. Thereafter the bypass valve 12 was closed and the water feed valve 11 was opened for carrying out ordinary fresh water generation work. In this case, the conductivity of permeated water obtained from the fresh water generating cartridge 4 was 11 $\mu$S/cm and the permeate flow rate was 4.3 L/min. The number of detected fungi was 0 CFU.

Example 5

The aforementioned service water was fed to the active carbon cartridge 2 at a flow rate of 6.5 L/min. for removing residual chlorine and fresh water generation work was carried out in the fresh water generating cartridge 4. During fresh water generation work (during operation of the fresh water generator), the flushing valve 9 was opened for 30 seconds once an hour for performing flushing. Further, the bypass valve 12 was fully opened for 30 seconds every time the flushing valve 9 was opened, for feeding service water containing residual chlorine to the fresh water generating cartridge 4. In other words, the first time interval c was one hour, the second time interval d was also one hour and the ratio c/d was 1 (c/d=1).

After a lapse of one hour from starting fresh water generation work, the conductivity of permeated water obtained from the fresh water generating cartridge 4 was 12 $\mu$S/cm and the permeate flow rate was 4.5 L/min. After a lapse of 500 hours from starting fresh water generation work, the conductivity of permeated water was 15 $\mu$S/cm and the permeate flow rate was 4.2 L/min. At this time, the number of detected fungi was 0 CFU.

Example 6

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2 and fresh water generation work was interrupted for 48 hours. During interruption of fresh water generation work (during shutdown of the fresh water generator), the flushing valve 9 and the water feed valve 11 were simultaneously opened for 30 seconds once in for hours for performing flushing. Further, the bypass valve 12 was fully opened for 30 seconds every time the flushing valve 9 was opened, for feeding service water containing residual chlorine to the fresh water generating cartridge 4. After interrupting fresh water generation work for 48 hours, the bypass valve 12 and the flushing valve 9 were closed and the water feed valve 11 was opened for feeding service water to the active carbon cartridge 2 and restarting fresh water generation work. Such fresh water generation work and interruption were repeated. In other words, the first time interval c was four hours, the second time interval d was also four hours and the ratio c/d was 1 (c/d=1).

After a lapse of one hour from starting fresh water generation work, the conductivity of permeated water obtained from the fresh water generating cartridge 4 was 11 $\mu$S/cm and the permeate flow rate was 4.5 L/min. After a lapse of 500 hours from starting fresh water generation work, the conductivity of permeated water was 16 $\mu$S/cm and the permeate flow rate was 4.1 L/min. At this time, the number of detected fungi was 0 CFU.

Example 7

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2. Simultaneously with interruption of fresh water generation work (simultaneously with shutdown of the fresh water generator), the flushing valve 9 was opened for 30 seconds for performing flushing. Further, the bypass valve 12 was fully opened for 30 seconds every time the flushing valve 9 was opened, for feeding service water containing residual chlorine to the fresh water generating cartridge 4. Thereafter the bypass valve 12 and the flushing valve 9 were closed for interrupting fresh water generation work for 3 hours.

After interrupting fresh water generation work for 3 hours, the water feed valve 11 was opened for feeding service water to the active carbon cartridge 2 and restarting fresh water generation work. Such fresh water generation work and interruption were repeated.

After a lapse of one hour from starting fresh water generation work, the conductivity of permeated water obtained from the fresh water generating cartridge 4 was 11 $\mu$S/cm and the permeate flow rate was 4.5 L/min. After a lapse of 500 hours from starting fresh water generation work, the conductivity of permeated water was 15 $\mu$S/cm and the permeate flow rate was 4.2 L/min. At this time, the number of detected fungi was 0 CFU.

Example 8

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2 and fresh water generation work was interrupted for 3 hours.

After interrupting fresh water generation work for 3 hours, the flushing valve 9 was fully opened for 30 seconds when restarting fresh water generation work(restarting operation of the freshwater generator) for performing flushing. Further, the bypass valve 12 was fully opened for 30 seconds every time the flushing valve 9 was opened, for feeding service water containing residual chlorine to the fresh water generating cartridge 4. Thereafter the flushing valve 9 and the bypass valve 12 were closed and the water feed valve 11 was opened for carrying out ordinary fresh water generation work. Such fresh water generation work and interruption were repeated.

After a lapse of one hour from starting fresh water generation work, the conductivity of permeated water obtained from the fresh water generating cartridge 4 was 12 $\mu$S/cm and the permeate flow rate was 4.5 L/min. After a lapse of 500 hours from starting fresh water generation work, the conductivity of permeated water was 15 $\mu$S/cm and the permeate flow rate was 4.2 L/min. At this time, the number of detected fungi was 0 CFU.

Comparative Example 1

The aforementioned service water was fed to the active carbon cartridge 2 at a flow rate of 6.5 L/min. for removing residual chlorine and fresh water generation work was carried out in the fresh water generating cartridge 4 for 24 hours. Thereafter the water feed valve 11 was closed to stop feeding service water to the active carbon cartridge 2 and fresh water generation work was interrupted for 48 hours.

After interrupting fresh water generation work for 48 hours, the water feed valve 11 was opened for feeding service water to the active carbon cartridge 2 and restarting fresh water generation work. In this case, the conductivity of permeated water obtained from the fresh water generating cartridge 4 was 45 µS/cm and the permeate flow rate was 2.5 L/min. At this time, the number of fungi detected on the water intake of the permeated water outlet pipe 5 was 960 CFU, although the number of fungi detected from the permeated water was 0 CFU in the vicinity of the outlet of the membrane module.

Comparative Example 2

The aforementioned service water was fed to the active carbon cartridge 2 at a flow rate of 6.5 L/min. for removing residual chlorine and fresh water generation work was carried out in the fresh water generating cartridge 4. During fresh water generation work, the flushing valve 9 was opened for 30 seconds once an hour, for performing flushing. The bypass valve 12 was fully closed during this time.

After a lapse of one hour from starting fresh water work, the conductivity of permeated water obtained from the fresh water generating cartridge 4 was 11 µS/cm and the permeate flow rate was 4.4 L/min. After a lapse of 500 hours from starting fresh water generation work, the conductivity of permeated water was 16 µS/cm and the permeate flow rate was 4.1 L/min. At this time, the number of fungi detected on the water intake of the permeated water outlet pipe 5 was 850 CFU, although the number of fungi detected from the permeated water was 0 CFU in the vicinity of the outlet of the membrane module.

Comparative Example 3

The aforementioned service water was fed to the active carbon cartridge 2 at a flow rate of 6.5 L/min. for removing residual chlorine and fresh water generation work was carried out in the fresh water generating cartridge 4. During fresh water generation work, the flushing valve 9 was opened for 30 seconds once an hour, for performing flushing. During fresh water generation work, the bypass valve 12 was fully opened.

In other words, the first time interval c was zero, the second time interval d was one hour, and the ratio c/d was zero (c/d=0).

After a lapse of one hour from starting fresh water generation work, the conductivity of permeated water obtained from the fresh water generating cartridge 4 was 13 µS/cm and the permeate flow rate was 4.4 L/min. After a lapse of 500 hours from starting fresh water generation work, the conductivity of permeated water was 30 µS/cm and the permeate flow rate was 4.1 L/min. At this time, the number of fungi detected from the permeated water was 0 CFU.

It is understood from Examples 1 to 4 that high-quality permeated water is obtained at a high permeate flow rate with no propagation of bacteria in restarted fresh water generation work when the bypass valve 12 is opened during interruption of fresh water generation work, during fresh water generation work, simultaneously with interruption of fresh water generation work or when restarting fresh water generation work for feeding service water containing residual chlorine to the fresh water generating cartridge 4.

It is also understood that permeated water obtained in restarted fresh water generation work has low quality and a low permeate flow rate with propagation of bacteria when no service water containing residual chlorine is fed to the fresh water generating cartridge 4 as in comparative example 1.

It is understood from Examples 5 to 8 that high-quality permeated water can be obtained over a long period at a high permeate flow rate with no propagation of bacteria when the flushing valve 9 is periodically opened during fresh water generation work or interruption of fresh water operation work for performing flushing or flushing is performed simultaneously with interruption of fresh water generation work or when restarting fresh water generation work while opening the bypass valve 12 every flushing for feeding service water containing residual chlorine to the fresh water generating cartridge 4.

It is also understood that bacteria disadvantageously propagate when the flushing valve 9 is periodically opened for performing flushing while closing the bypass valve 12 during fresh water generation work as in comparative example 2, although high-quality permeated water can be obtained over a long period with small reduction of the permeate flow rate in this case.

It is further understood that the quality of permeated water is reduced when the flushing valve 9 is periodically opened while opening the bypass valve 12 during fresh water generation work as in comparative example 3, although reduction of the permeate flow rate is small over a long period with no propagation of bacteria in this case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fresh water generator comprising:

a fresh water generating cartridge, including a reverse osmosis membrane, for desalinating a target liquid having a prescribed pressure of at least 0.3 kgf/cm$^2$ and not more than 3 kgf/cm$^2$;

a pretreater provided in the preceding stage to said fresh water generating cartridge for removing residual chlorine contained in said target liquid;

a feed system for feeding said target liquid at the prescribed pressure to said pretreater without step-up means for stepping up the pressure of said target liquid;

a bypass path provided to bypass said pretreater; opening/closing means for open and closing said bypass path;

a permeated liquid outlet path out a permeated liquid obtained from said fresh water generating cartridge;

a permeated liquid discharge path discharging said permeated liquid; and a flushing means for flushing said reverse osmosis membrane of said fresh water generating cartridge;

wherein said reverse osmosis membrane has a permeate flux of at least 0.1 m$^3$/m$^2$·day·kgf/cm$^2$ and a rejection performance of at least 95% for an NaCl aqueous solution of 0.05% in concentration.

2. The fresh water generator in accordance with claim 1, wherein said opening/closing means periodically opens said bypass path.

3. The fresh water generator in accordance with claim 1, wherein said opening/closing means temporarily opens said bypass path and thereafter closes said bypass path when fresh water generation work with said fresh water generating cartridge is started.

4. The fresh water generator in accordance with claim 1, wherein
said opening/closing means opens said bypass path during fresh water generation work with said fresh water generating cartridge.

5. The fresh water generator in accordance with claim 1, wherein
said opening/closing means opens said bypass path simultaneously with stoppage of fresh water generation work with said fresh water generating cartridge.

6. The fresh water generator in accordance with claim 1, wherein
said opening/closing means opens said bypass path during stoppage of fresh water generation work with said fresh water generating cartridge.

7. The fresh water generator in accordance with claim 1, wherein
said fresh water generating cartridge is formed by a plurality of fresh water generating cartridges connected in parallel and/or in series with each other.

8. The fresh water generator in accordance with claim 1, wherein
said opening/closing means includes a opening/closing valve.

9. The fresh water generator in accordance with claim 8, wherein
said opening/closing value includes a first automatic valve,
said fresh water generator further comprising a first controller controlling an opening and closing operation of said first automatic valve.

10. The fresh water generator in accordance with claim 9, wherein
said first controller controls said first automatic valve to open said first automatic valve by a prescribed time at a prescribed time interval.

11. The fresh water generator in accordance with claim 7, wherein
said flushing means periodically performs a flushing operation.

12. The fresh water generator in accordance with claim 1, wherein
said flushing means is adapted to perform a flushing operation following an interruption of fresh water generation work, when fresh water generation work within said fresh water generating cartridge is started.

13. The fresh water generator in accordance with claim 1, wherein
said flushing means performs a flushing operation during fresh water generation work with said fresh water generating cartridge.

14. The fresh water generator in accordance with claim 1, wherein
said flushing means performs a flushing operation simultaneously with stoppage of fresh water generation work with said fresh water generating cartridge.

15. The fresh water generator in accordance with claim 1, wherein
said flushing means performs a flushing operation during stoppage of fresh water generation work with said fresh water generating cartridge.

16. The fresh water generator in accordance with claim 1, wherein
said flushing means includes a flushing valve.

17. The fresh water generator in accordance with claim 16, wherein
said flushing valve includes a second automatic valve,
said fresh water generator further comprising a second controller controlling an opening and closing operation of said second automatic valve.

18. The fresh water generator in accordance with claim 17, wherein
said second controller controls said second automatic valve to open said second automatic valve by a prescribed time at a prescribed time interval.

19. The fresh water generator in accordance with claim 1, wherein
said opening/closing means includes a first automatic valve and said flushing means includes a second automatic valve,
said fresh water generator further comprising a controller independently or simultaneously controlling opening and closing operations of said first automatic valve and said second automatic valve respectively.

20. The fresh water generator in accordance with claim 1, wherein
said opening/closing means opens said bypass path at a first time interval c, said flushing means performs a flushing operation at a second time interval d, and the ratio c/d of said first time interval c to said second time interval d is: $c/d \geq 1$.

21. The fresh water generator in accordance with claim 1, wherein
said permeated liquid is periodically discharged through said permeated liquid discharge path.

22. The fresh water generator in accordance with claim 1, wherein
said permeated liquid is discharged through said permeated liquid discharge path when fresh water generation work with said fresh water generating cartridge is started.

23. The fresh water generator in accordance with claim 1, wherein
said permeated liquid produced during fresh water generation work is discharged through said permeated liquid discharge path during stoppage of fresh water generation work within said fresh water generating cartridge.

24. The fresh water generator in accordance with claim 1, further comprising:
a permeate liquid outlet valve provided in said permeated liquid outlet path; and
a permeated liquid discharge valve provided in said permeated liquid discharge path.

25. A fresh water generator comprising:
a fresh water generating cartridge, including a reverse osmosis membrane, for desalinating a target liquid and producing a permeated liquid having a flowrate, b, said target liquid having a flowrate, a, and a prescribed pressure:
a pretreater provided in the preceding stage to said fresh water generating cartridge for removing residual chlorine contained in said target liquid;
a feed system for feeding said target liquid to said pretreater without step-up means for stepping up the pressure of said target liquid;
a bypass path provided to bypass said pretreater; opening/closing means for opening and closing said bypass path;

a permeated liquid outlet path taking out said permeated liquid obtained from said fresh water generating cartridge;

a permeated liquid discharge path discharging said permeated liquid; and means for controlling a ratio b/a to greater than 0.5.

26. The fresh water generator in accordance with claim 25 further comprising:

a permeated liquid outlet valve provided in said permeated liquid path, and a permeated liquid discharge valve provided in said permeated liquid discharge path.

27. A fresh water generating method comprising the steps of:

feeding a target liquid having a prescribed pressure of at least 0.3 kgf/cm$^2$ and not more than 3 kgf/cm$^2$ to a fresh water generating cartridge including a reverse osmosis membrane through a pretreater for removing residual chlorine without step-up means for stepping up the pressure;

feeding said target liquid to said fresh water generating cartridge while bypassing said pretreater at prescribed timing; and flushing said reverse osmosis membrane of said fresh water generating cartridge at prescribed timing;

wherein said reverse osmosis membrane has a permeate flux of at least 0.1 m$^3$/m$^2$·day·kgf/cm$^2$ and a rejection performance of at least 95% for an NaCl aqueous solution of 0.05% in concentration.

28. The fresh water generating method in accordance with claim 27, further comprising a step of discharging a permeated liquid obtained from said fresh water generating cartridge through a permeated liquid discharge path at prescribed timing.

29. The fresh water generating method in accordance with claim 27, further comprising a step of applying a permeated liquid obtained from said fresh water generating cartridge to wash water, soft water for a boiler, soft water for preparing food, agricultural water for hydroponics, pure water for a laboratory, water for a humidifier or potable water.

30. The fresh water generating method in accordance with claim 27, further comprising a step of feeding a permeated liquid obtained from said fresh water generating cartridge to an ion exchanger or a continuous electric regenerative ion exchanger.

31. A fresh water generating method comprising the step of:

feeding a target liquid having a prescribed pressure of at least 0.3 kgf/cm$^2$ and not more than 3 kg/cm$^2$ to a fresh water generating cartridge including a reverse osmosis membrane through a pretreater to remove residual chlorine without a step up means for stepping up the pressure; and feeding said target liquid to said fresh water generating cartridge while bypassing said pretreater at a prescribed timing, wherein the ratio b/a of the flow rate b of a permeated liquid obtained from said fresh water generating cartridge to the flow rate a of said target liquid fed to said fresh water generating cartridge is: b/a>0.5.

* * * * *